United States Patent
Hibara et al.

(10) Patent No.: US 9,826,360 B2
(45) Date of Patent: Nov. 21, 2017

(54) NETWORK SYSTEM, PORTABLE TERMINAL DEVICE, AND METHOD FOR SPECIFYING DEVICE

(71) Applicant: Mitsubishi Electric Corporation, Tokyo (JP)

(72) Inventors: Naoyuki Hibara, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/903,297

(22) PCT Filed: Jul. 12, 2013

(86) PCT No.: PCT/JP2013/069209
§ 371 (c)(1),
(2) Date: Jan. 7, 2016

(87) PCT Pub. No.: WO2015/004812
PCT Pub. Date: Jan. 15, 2015

(65) Prior Publication Data
US 2016/0219406 A1 Jul. 28, 2016

(51) Int. Cl.
*H04W 4/02* (2009.01)
*H04L 12/24* (2006.01)
(Continued)

(52) U.S. Cl.
CPC .............. *H04W 4/023* (2013.01); *G01S 11/06* (2013.01); *G06F 3/0482* (2013.01);
(Continued)

(58) Field of Classification Search
CPC ........ G01S 11/06; G01S 5/021; G01S 5/0289; G01S 11/02; G06F 3/0482;
(Continued)

(56) References Cited

U.S. PATENT DOCUMENTS 6,992,625 B1* 1/2006 Krumm ................ G01C 21/206
342/451
9,432,361 B2* 8/2016 Mahaffey ............ H04L 63/0853
(Continued)

FOREIGN PATENT DOCUMENTS

GB 2466049 A 6/2010
JP H10-093665 A 4/1998
(Continued)

OTHER PUBLICATIONS

International Search Report of the International Searching Authority dated Aug. 6, 2013 for the corresponding International application No. PCT/JP2013/069209 (and English translation).

(Continued)

*Primary Examiner* — Devan Sandiford
(74) *Attorney, Agent, or Firm* — Posz Law Group, PLC

(57) ABSTRACT

A reception electric field intensity or a transmission delay time in wireless communication between each of multiple apparatuses connected to one and the same network and a portable terminal device is measured. Degrees of nearness, where a degree of nearness indicates a nearness between each of the multiple apparatuses and the portable terminal device in a numerical value are calculated based on a measurement result. One apparatus is selected from among the multiple apparatuses as a candidate target apparatus based on the degrees of nearness calculated. The candidate target apparatus selected is requested to execute a predetermined. A decision on whether or not to approve the candidate target apparatus selected is received from the user, and the candidate target apparatus is identified as a work-target apparatus intended by the user when the user has approved.

18 Claims, 17 Drawing Sheets

(51) Int. Cl.

| | | |
|---|---|---|
| *G01S 11/06* | (2006.01) | |
| *H04L 29/08* | (2006.01) | |
| *H04L 12/64* | (2006.01) | |
| *H04L 12/26* | (2006.01) | |
| *H04B 17/318* | (2015.01) | |
| *G06F 3/0482* | (2013.01) | |
| *G06F 3/0484* | (2013.01) | |
| *H04W 24/08* | (2009.01) | |
| *H04W 4/00* | (2009.01) | |

(52) U.S. Cl.
CPC ....... *G06F 3/04842* (2013.01); *H04B 17/318* (2015.01); *H04L 12/6418* (2013.01); *H04L 41/0889* (2013.01); *H04L 43/0852* (2013.01); *H04L 67/1021* (2013.01); *H04L 67/18* (2013.01); *H04W 4/008* (2013.01); *H04W 24/08* (2013.01)

(58) Field of Classification Search
CPC .. G06F 3/04842; H04B 17/318; H04W 24/00; H04W 24/08; H04W 4/023; H04W 64/00; H04L 12/2803; H04L 2012/285; H04L 12/2809; H04L 12/2816; H04L 12/2807; H04L 12/2814; G05B 2219/2613; H04N 21/4131
See application file for complete search history.

(56) References Cited

U.S. PATENT DOCUMENTS

| | | | |
|---|---|---|---|
| 2003/0191825 A1 | 10/2003 | Miyazaki et al. | |
| 2006/0019679 A1* | 1/2006 | Rappaport | H04W 64/00 455/456.5 |
| 2006/0075131 A1* | 4/2006 | Douglas | G01S 5/0252 709/230 |
| 2006/0092037 A1* | 5/2006 | Neogi | G08C 23/04 340/4.3 |
| 2008/0200181 A1* | 8/2008 | Zill | G01S 5/02 455/456.1 |
| 2009/0286549 A1* | 11/2009 | Canon | G01S 3/74 455/456.1 |
| 2010/0036512 A1* | 2/2010 | Rutjes | H04L 12/282 700/90 |
| 2010/0141531 A1* | 6/2010 | Nam | G01S 5/14 342/451 |
| 2010/0144274 A1 | 6/2010 | McDowall et al. | |
| 2013/0138796 A1* | 5/2013 | Nicholson | H04L 67/16 709/224 |
| 2013/0273936 A1 | 10/2013 | Hibara et al. | |
| 2014/0030982 A1* | 1/2014 | Cardona | G01S 5/14 455/67.11 |
| 2015/0010167 A1* | 1/2015 | Arling | H04N 21/42226 381/105 |
| 2015/0348403 A1* | 12/2015 | Berelejis | G08C 23/02 367/197 |
| 2015/0350031 A1* | 12/2015 | Burks | H04L 41/22 715/736 |
| 2016/0037332 A1* | 2/2016 | Egeler | G08C 17/02 455/420 |
| 2017/0093593 A1* | 3/2017 | Yang | H04L 12/2816 |

FOREIGN PATENT DOCUMENTS

| | | |
|---|---|---|
| JP | 2003-296205 A | 10/2003 |
| JP | 2006-349307 A | 12/2006 |
| JP | 2008-244942 A | 10/2008 |
| WO | 2012/104983 A1 | 8/2012 |

OTHER PUBLICATIONS

Office Action dated May 27, 2017 issued in corresponding CN patent application No. 201380078161.6 (and partial English translation).

Extended European Search Report dated Feb. 8, 2017 in the corresponding EP application No. 13889096.7.

Office Action dated Jul. 7, 2017 issued in corresponding KR patent application No. 10-2016-7000785 (and partial English translation).

Office Action dated Sep. 11, 2017 issued in corresponding EP patent application No. 13889096.7.

* cited by examiner

Do you want to start measuring the reception intensity?

YES   NO

FIG.21

```
The first measurement of the reception intensity starts.

* Please be approximately 2 m away from the target apparatus.

START
```

FIG.22

```
The second measurement of the reception intensity starts.

* Please be approximately 1.8 m away from the target apparatus.

START
```

FIG.23

```
The third (last) measurement of the reception intensity starts.

* Please be approximately 1.5 m away from the target apparatus.

START
```

NETWORK SYSTEM, PORTABLE TERMINAL DEVICE, AND METHOD FOR SPECIFYING DEVICE

CROSS REFERENCE TO RELATED APPLICATION

This application is a U.S. national stage application of International Application No. PCT/JP2013/069209 filed on Jul. 12, 2013, the disclosure of which is incorporated herein by reference.

TECHNICAL FIELD

The present disclosure relates to a network system, a portable terminal device, and a target apparatus identification method.

BACKGROUND ART

In a building equipment network system or a home network system, an apparatus intended to operate can be controlled through communication using an apparatus identification number such as a communication address assigned to each apparatus.

Upon installation or maintenance of such an apparatus, a user such as a worker is sometimes required to do certain operations such as making a work-target apparatus execute an intended operation or entering intended settings on the apparatus through operation via a portable terminal device while visually checking the apparatus.

For the above-mentioned works in the prior art, for example, a sticker or the like on which an apparatus identification number is printed is pre-attached to the casing surface of the apparatus. The user visually reads the apparatus identification number printed on the sticker or the like and cross-checks the number on an apparatus list that the portable terminal device has.

The above-mentioned method requires the user to visually check the apparatus identification number printed on the sticker or the like for each apparatus to work on, which is time-consuming and inefficient. Moreover, when the apparatus is installed on a ceiling or the like, it is difficult to visually check the apparatus identification number and the workload is increased. Therefore, if the portable terminal device or the like is capable of identifying the apparatus that the user intends to work on without causing the user any trouble such as visually reading the apparatus identification number, the workload can be reduced.

For example, Patent Literature 1 describes that each apparatus constituting a network sends its apparatus identification number to a portable terminal device through short-range wireless communication for improving the efficiency in operating and managing the network.

CITATION LIST

Patent Literature

Patent Literature 1: Unexamined Japanese Patent Application Kokai Publication No. 2003-296205.

SUMMARY OF INVENTION

Technical Problem

With the technique described in the Patent Literature 1, in order to prevent the portable terminal device from receiving wireless signals from multiple apparatuses and misidentifying an apparatus, the communication range of the wireless communication unit of each apparatus has to be narrow so as not to overlap with the communication range of any other apparatuses.

For the above-mentioned reason, the user has to place the portable terminal device close to the apparatus to work on to be within the communication range. As a result, when the apparatus to work on is installed on a ceiling, the user needs to use a stepladder or the like to place the portable terminal device close to the apparatus, which is time-consuming and reduces work efficiency.

The present disclosure is made to solve the above-mentioned problem and an objective of the disclosure is to provide a network system or the like that makes it possible to accurately identify an apparatus that the user intends to work on without requiring the user to do cumbersome work.

Solution to Problem

In order to achieve the above-mentioned objective, the network system according to the present disclosure comprises:

measuring means for measuring a reception electric field intensity or a transmission delay time in wireless communication between each of multiple apparatuses connected to a network and a portable terminal device;

nearness degree calculation means for calculating degrees of nearness, wherein a degree of nearness indicates a nearness between each of the multiple apparatuses and the portable terminal device in a numerical value based on a measurement result by the measuring means;

operation request means for selecting one apparatus from among the multiple apparatuses as a candidate target apparatus based on the degrees of nearness calculated by the nearness degree calculation means and requesting the candidate target apparatus to execute a predetermined operation; and apparatus identification means for receiving a decision on whether or not to approve the candidate target apparatus from a user and identifying the candidate target apparatus as a work-target apparatus intended by the user when the user has approved.

Advantageous Effects of Invention

The present disclosure makes it possible to accurately identify an apparatus that the user intends to work on without requiring the user to do cumbersome work.

BRIEF DESCRIPTION OF DRAWINGS

FIG. 21 is an illustration showing an example of a first measurement confirmation screen in Embodiment 3;

FIG. 22 is an illustration showing an example of a second measurement confirmation screen in Embodiment 3;

FIG. 23 is an illustration showing an example of the third measurement confirmation screen in Embodiment 3;

DESCRIPTION OF EMBODIMENTS

Figure 1:
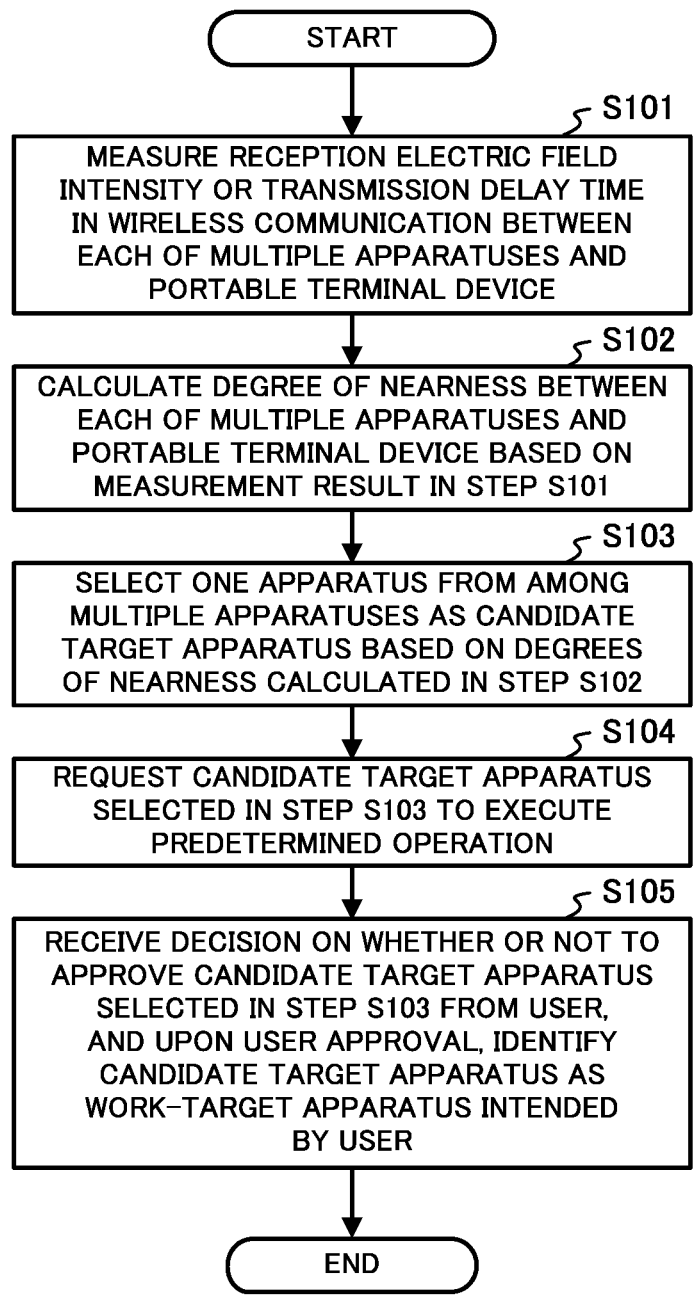
FIG. 1 is a flowchart for explaining the basic concept of the present disclosure.

Prior to an explanation of embodiments of the present disclosure, a basic concept of the present disclosure is described with reference to the flowchart of FIG. 1. With the present disclosure, first, a reception electric field intensity or a transmission delay time in wireless communication between each of multiple apparatuses connected to one and the same network and a portable terminal device is measured (Step S101). Then, the degree of nearness between each of the multiple apparatuses and the portable terminal device is calculated based on the measurement results in Step S101 (Step S102). Then, one apparatus is selected as a candidate target apparatus from among the multiple apparatuses based on the degrees of nearness calculated in Step S102 (Step S103). Then, the candidate target apparatus selected in Step S103 is requested to execute a predetermined operation (Step S104). Subsequently, a decision on whether or not to approve the candidate target apparatus selected in Step S103 is received from a user, and upon an approval by the user, the candidate target apparatus is identified as a work-target apparatus intended by the user (Step S105).

The basic concept of the present disclosure is as described above. The embodiments of the present disclosure are described below in detail with reference to the drawings.

Embodiment 1

Figure 2:
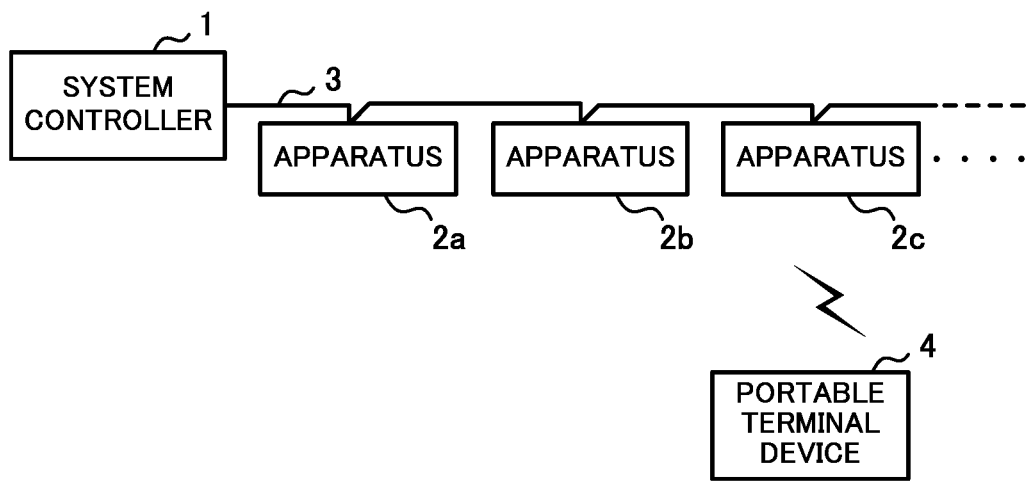
FIG. 2 is a diagram showing an entire configuration of a network system according to embodiments of the present disclosure.

FIG. 2 is a diagram showing the entire configuration of a network system according to Embodiment 1 of the present disclosure. This network system includes a system controller 1, multiple apparatuses 2 (apparatuses 2a, 2b, 2c, . . . ), and a portable terminal device 4.

The system controller 1 and the multiple apparatuses 2 (apparatuses 2a, 2b, 2c, . . . ) are connected to a network 3 and constitute an equipment apparatus system. The apparatuses 2 are, for example, equipment apparatuses such as air conditioners and lighting apparatuses installed in an office building. The system controller 1 monitors operation states of the apparatuses 2 and controls the apparatuses 2. The network 3 is constructed using, for example, known network techniques for general building equipment systems.

Figure 3:
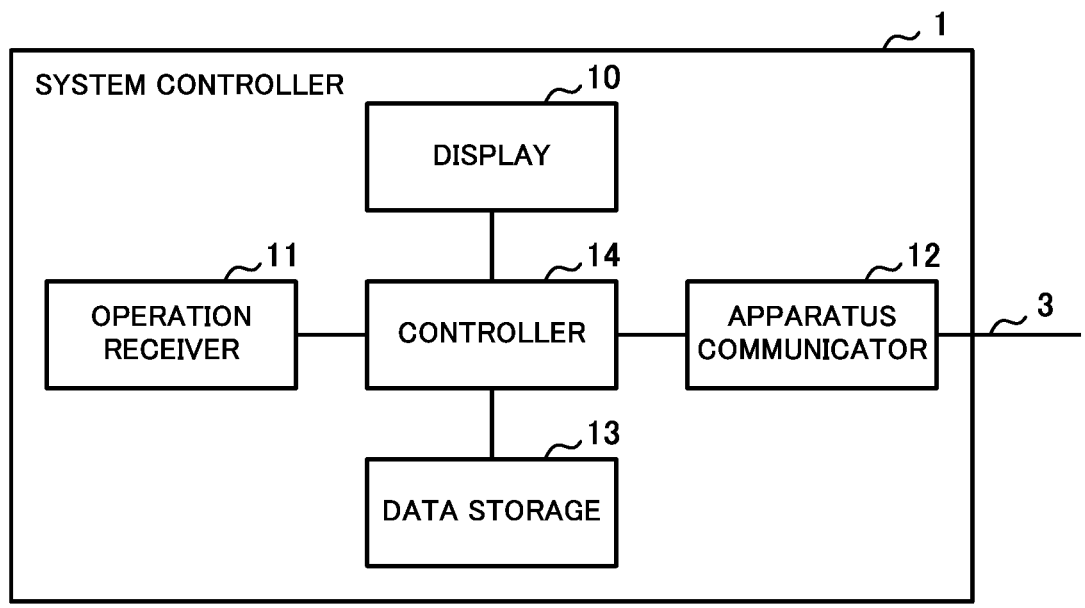
FIG. 3 is a block diagram showing a configuration of a system controller in Embodiment 1.

The system controller 1 includes, as shown in FIG. 3, a display 10, an operation receiver 11, an apparatus communicator 12, a data storage 13, and a controller 14. The display 10 is configured by, for example, a liquid crystal display or the like, and displays various kinds of information regarding the apparatuses 2 such as operation screens and monitoring screens for the apparatuses 2 under the control of the controller 14. The operation receiver 11 includes, for example, a keyboard, mouse, keypad, touch pad, touch panel, and/or the like, and receives input operation from a user and sends signals regarding the received input operation to the controller 14.

The apparatus communicator 12 includes, for example, a communication interface such as a local area network (LAN) card, and conducts data communication with the apparatuses 2 in compliance with a predetermined communication scheme via the network 3 under the control of the controller 14. The data storage 13 functions as a so-called secondary storage (auxiliary storage) and is configured by, for example, a readable/writable nonvolatile semiconductor memory such as a flash memory. The data storage 13 stores, for example, data and programs for controlling the apparatuses 2.

The controller 14 includes a central processing unit (CPU), a read only memory (ROM), a random access memory (RAM), and the like (none are depicted), and comprehensively controls the system controller 1.

Figure 4:
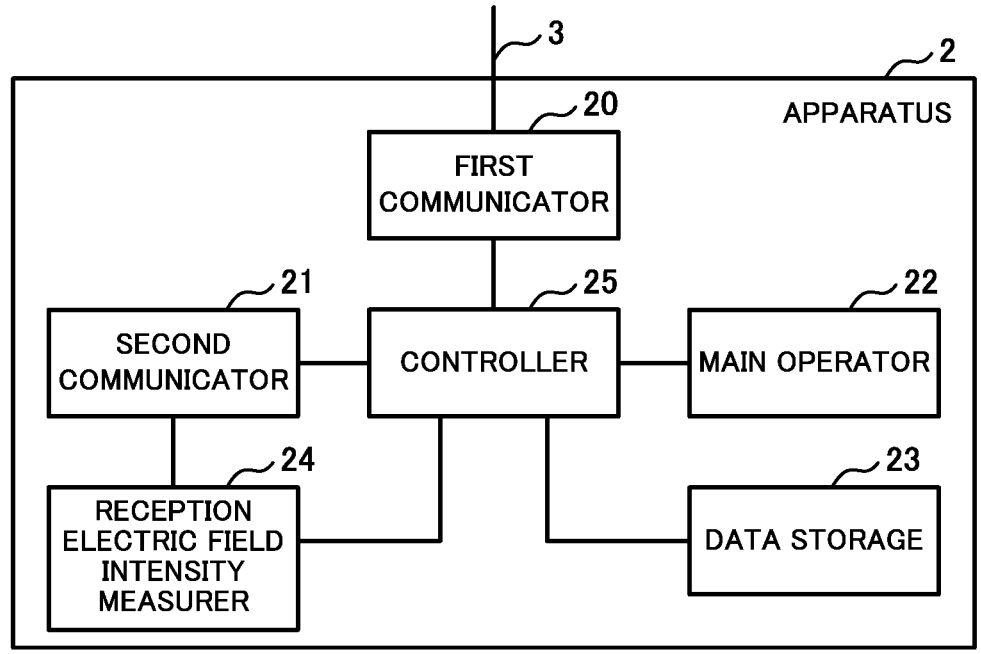
FIG. 4 is a block diagram showing a configuration of an apparatus in Embodiment 1.

The apparatuses 2 each comprise, as shown in FIG. 4, a first communicator 20, a second communicator 21, a main operator 22, a data storage 23, a reception electric field intensity measurer 24, and a controller 25. The first communicator 20 includes, for example, a communication interface such as a LAN card, is connected to the network 3 so as to allow wired or wireless communication, and conducts data communication with the system controller 1 via the network 3 under the control of the controller 25.

The second communicator 21 includes a predetermined wireless communication interface, and conducts data communication with the portable terminal device 4 in compliance with a predetermined wireless communication scheme under the control of the controller 25. The main operator 22 is a component for realizing the intrinsic function (for example, lighting or air conditioning) of the apparatus 2.

The data storage 23 is configured by, for example, a readable/writable nonvolatile semiconductor memory such as a flash memory. The data storage 23 stores programs and data for data communication with each of the system controller 1 and portable terminal device 4, programs and data for controlling the main operator 22, and the like.

The reception electric field intensity measurer 24 measures the electric field intensity at the time of wireless data reception from the portable terminal device 4. The controller 25 includes a CPU, a ROM, a RAM, and the like (none are depicted), and comprehensively controls the apparatus 2. For example, upon receiving control data indicating an operation request from the system controller 1 via the first communicator 20, the controller 25 controls the main operator 22 based on the contents of the control data. Moreover, upon receiving measurement request data, which is described below, from the portable terminal device 4 via the second communicator 21, the controller 25 creates data containing measurement results of the reception electric field intensity measurer 24 (measurement data) and sends the data to the portable terminal device 4 via the second communicator 21. Moreover, upon receiving operation request data for confirmation, which is described below, and the like from the portable terminal device 4 via the second communicator 21, the controller 25 controls the main operator 22 according to the contents of the received operation request data for confirmation and the like.

Figure 5:
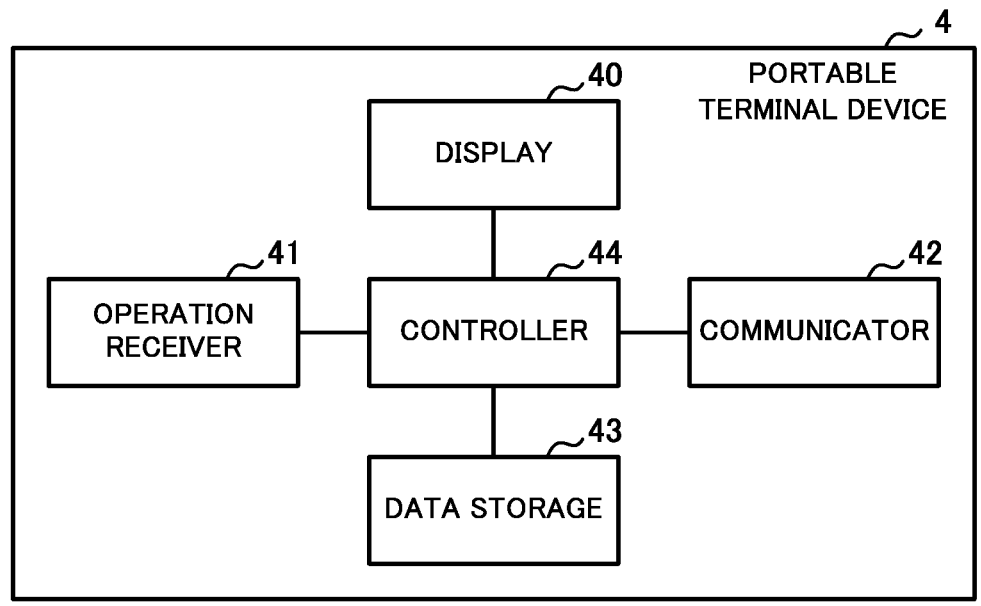
FIG. 5 is a block diagram showing a configuration of a portable terminal device in Embodiment 1.

The portable terminal device 4 includes, as shown in FIG. 5, a display 40, an operation receiver 41, a communicator 42, a data storage 43, and a controller 44. The portable terminal device 4 can be realized via, for example, a portable device such as a tablet terminal and a smartphone.

The display 40 is configured by a liquid crystal display or the like, and displays various screens and the like in accordance with the user operation under the control of the controller 44. The operation receiver 41 is configured by a touch panel, touch pad, or the like, and conducts a process to receive operation input from the user. The communicator 42 includes a predetermined wireless communication interface, and conducts data communication with the apparatuses 2 in compliance with a predetermined wireless communication scheme under the control of the controller 44.

The data storage 43 functions as a secondary storage (auxiliary storage) and is configured by, for example, a readable/writable nonvolatile semiconductor memory such as a flash memory. The data storage 43 stores various programs including a program for the process characteristic to the present disclosure (the target apparatus identification process described below), various data used in executing the programs, and the like.

Figures 6, 7:
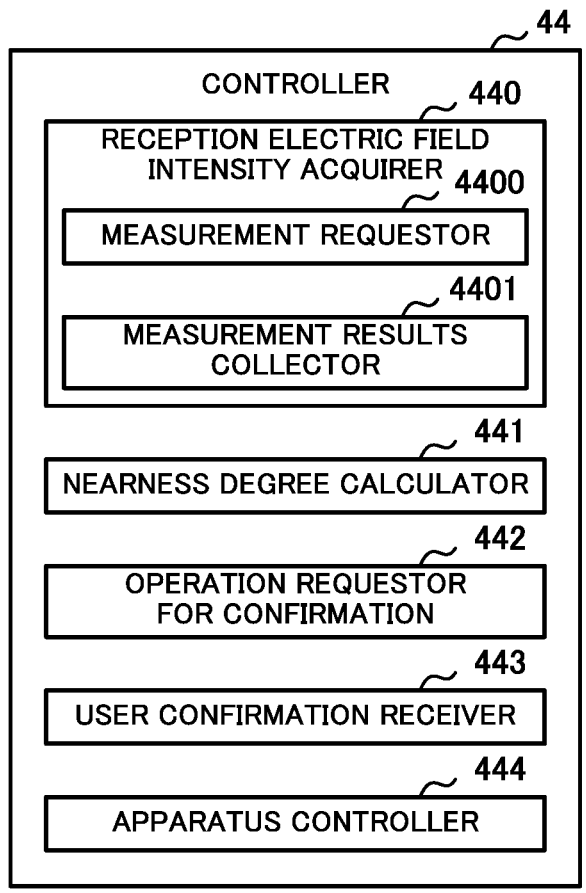
FIG. 6 is a block diagram showing a functional configuration of a controller of the portable terminal device in Embodiment 1.
FIG. 7 is an illustration showing an example of a measurement start inquiry screen.

Although not depicted, the controller 44 includes a CPU, a ROM, a RAM, and the like, and comprehensively controls the portable terminal device 4. The controller 44 functionally includes, as shown in FIG. 6, a reception electric field intensity acquirer 440, a nearness degree calculator 441, an operation requestor for confirmation 442, a user confirmation receiver 443, and an apparatus controller 444. The functions of these components are realized by, for example, the CPU of the controller 44 executing the target apparatus identification process program stored in the data storage 43.

The reception electric field intensity acquirer 440 acquires the reception electric field intensity measured by each apparatus 2. In more detail, the reception electric field intensity acquirer 440 includes a measurement requestor 4400 and a measurement results collector 4401. The measurement requestor 4400 requests each apparatus 2 to measure the reception electric field intensity. More specifically, as the above-mentioned target apparatus identification process program is activated, the measurement requestor 4400 displays a measurement start inquiry screen as shown in FIG. 7 on the display 40. As a button "YES" on the measurement start inquiry screen is pressed by the user, the measurement requestor 4400 broadcasts the above-mentioned measurement request data to the apparatuses 2.

The measurement results collector 4401 collects a measurement result of the reception electric field intensity measured by each apparatus 2. More specifically, the measurement results collector 4401 receives measurement data from each apparatus 2 via the communicator 42 and extracts the measurement result (namely the reception electric field intensity) from the received measurement data. The measurement results collector 4401 saves the extracted reception electric field intensity of each apparatus 2 in the RAM or the data storage 43 (hereinafter referred to as the RAM or the like).

The nearness degree calculator 441 calculates the degrees of nearness of the apparatuses 2 based on the reception electric field intensities of the apparatuses 2 collected by the measurement results collector 4401. Here, a degree of nearness is expressed by a numerical value indicating how short the distance between the portable terminal device 4 and an apparatus 2 is. The higher the value, the closer the portable terminal device 4 and the apparatus 2 are.

The nearness degree calculator 441 creates a list of apparatus identification numbers of respective apparatuses 2, the apparatus identification numbers being arranged in the descending order of calculated degrees of nearness (an apparatus list). Here, the apparatus identification number is information for identifying each apparatus 2 and also information necessary for controlling the main operation of each apparatus 2 through communication via the network 3. In this embodiment, it is assumed that the identification information is included in measurement data from the apparatuses 2.

Figure 8:
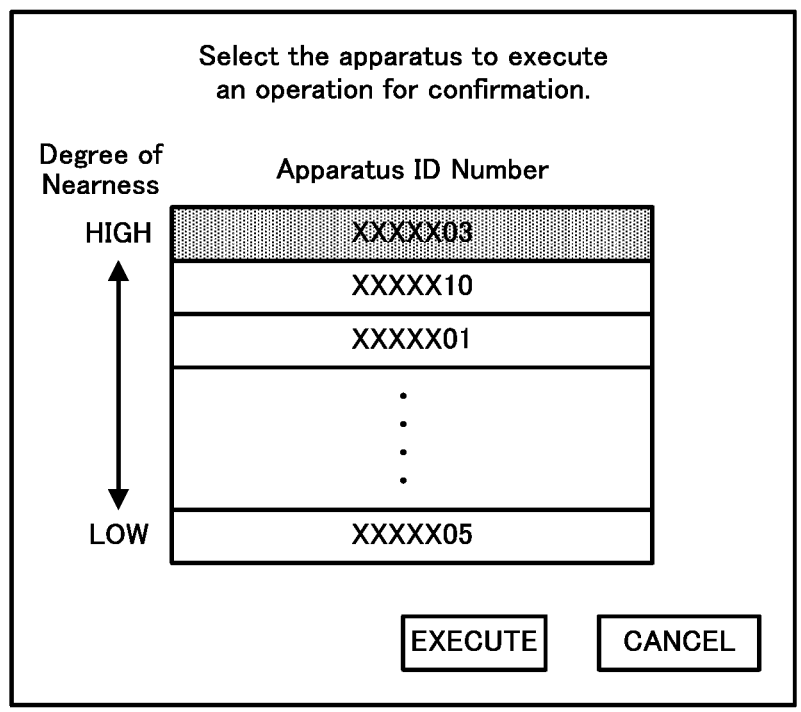
FIG. 8 is an illustration showing an example of an apparatus list screen.

The operation requestor for confirmation 442 (operation request means) requests the apparatus 2 designated by the user (a candidate target apparatus) to execute a predetermined operation that can be confirmed by the user (an operation for confirmation). More specifically, using the apparatus list created by the nearness degree calculator 441, the operation requestor for confirmation 442 displays on the display 40 an apparatus list screen as shown in FIG. 8. The user can select the field of the intended apparatus identification number on the apparatus list screen. Here, as a default specification, the field of the apparatus identification number corresponding to the apparatus 2 with the highest degree of nearness is displayed as a preselected field.

As the user presses a button "EXECUTE" on the apparatus list screen, the operation requestor for confirmation 442 sends data for requesting execution of an operation for confirmation (operation request data for confirmation) to the apparatus 2 having the apparatus identification number in the selected field via the communicator 42. As an operation for confirmation, when the apparatus 2 is an air conditioner, for example, the louver for adjusting the air direction is operated in a predetermined pattern. Alternatively, when the apparatus 2 is a lighting apparatus, for example, the light is blinked in a predetermined pattern or the brightness, color temperature, or the like of the light is changed in a predetermined pattern.

Figure 9:
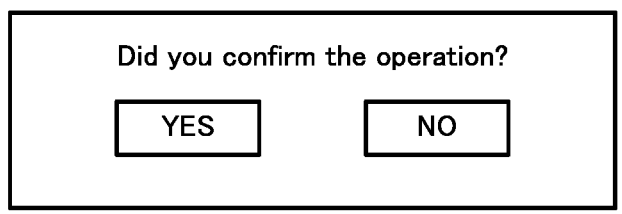
FIG. 9 is an illustration showing an example of a confirmation reception screen.

The user confirmation receiver 443 (apparatus identification means) receives from the user a confirmation result of the above-mentioned operation for confirmation, that is, a decision on whether or not to approve the candidate target apparatus. More specifically, after the operation requestor for confirmation 442 sends the above-mentioned operation request data for confirmation to the apparatus 2, the user confirmation receiver 443 pop-up displays a confirmation reception screen as shown in FIG. 9 over the apparatus list screen (see FIG. 8) on the display 40.

The user presses a button "YES" on the confirmation reception screen when the user successfully confirmed the execution of the above-mentioned operation for confirmation by the apparatus 2 intended to work on. In such a case, this means that the candidate target apparatus is approved. On the other hand, the user presses a button "NO" when the user failed to confirm the execution of the above-mentioned operation for confirmation by the intended apparatus 2. In such a case, this means that the candidate target apparatus is not approved.

As the button "YES" is pressed, the user confirmation receiver 443 identifies the apparatus 2 of which the operation for confirmation was confirmed by the user, namely the apparatus 2 to which the operation request data for confirmation was sent as the apparatus 2 that the user intends to work on (namely, the work-target apparatus). For example, the user confirmation receiver 443 saves the apparatus identification number of the identified apparatus 2 in the RAM or the like in association with information indicating a work target.

The apparatus controller 444 displays an operation screen (not depicted) for the apparatus 2 identified as the work target of the user on the display 40. Then, the apparatus controller 444 creates control data based on the contents of operation conducted by the user via the operation screen, and sends the control data to the work-target apparatus 2 via the communicator 42. Through operation via the operation screen, the user can, for example, make the work-target apparatus 2 execute various operations such as test runs and operations for maintenance works or enter various settings such as settings of communication parameters, group operation, and names on the work-target apparatus 2.

Figure 10:
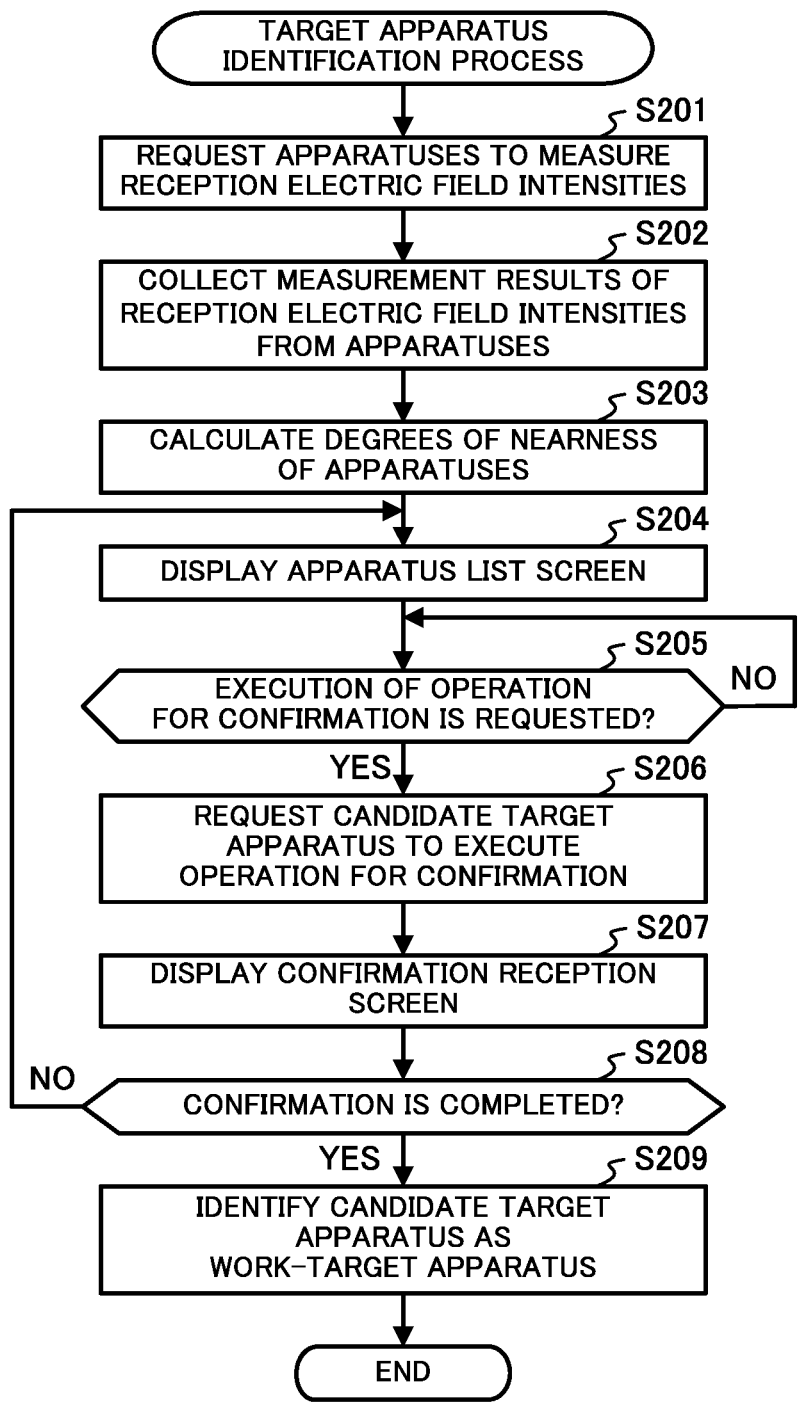
FIG. 10 is a flowchart showing a procedure of a target apparatus identification process in Embodiment 1.

FIG. 10 is a flowchart showing the procedure of the target apparatus identification process executed by the controller 44 of the portable terminal device 4. The target apparatus identification process starts as the user presses the button "YES" on the measurement start inquiry screen (see FIG. 7) after the target apparatus identification process program is activated.

The measurement requestor 4400 broadcasts measurement request data to the apparatuses 2 via the communicator 42 (Step S201). Upon receiving the measurement request data, each apparatus 2 creates measurement data containing a measurement result by the reception electric field intensity measurer 24 (namely the electric field intensity at the time of reception of the measurement request data) and the apparatus identification number of itself. Then, each apparatus 2 sends the created measurement data to the portable terminal device 4.

The measurement results collector 4401 receives the measurement data from the apparatuses 2 via the communicator 42 and collects the measurement result contained in each measurement data (namely the reception electric field intensity) (Step S202). The measurement results collector 4401 continues to wait for reception of measurement data from the apparatuses 2 until the elapsed time since the measurement request data was broadcasted (a reception wait time) has reached a preset time (a reception time-out period). Then, as the reception wait time has reached the reception time-out period, the measurement results collector 4401 notifies the nearness degree calculator 441 that the collection is completed.

Upon receiving the above-mentioned notification from the measurement results collector 4401, the nearness degree calculator 441 calculates the degree of nearness of each apparatus 2 based on the reception electric field intensities measured at the apparatuses 2 (Step S203). Then, the nearness degree calculator 441 creates the above-mentioned apparatus list based on the calculated degrees of nearness of the apparatuses 2.

Using the apparatus list created by the nearness degree calculator 441, the operation requestor for confirmation 442 displays the apparatus list screen (see FIG. 8) on the display 40 (Step S204). As the user presses the button "EXECUTE" on the apparatus list screen (Step S205; YES), the operation requestor for confirmation 442 sends operation request data for confirmation to the apparatus 2 having the apparatus identification number designated by the user (namely a candidate target apparatus) via the communicator 42 (Step S206). Moreover, as the user presses a button "CANCEL" on the apparatus list screen, the controller 44 ends the target apparatus identification process and displays the measurement start inquiry screen (see FIG. 7) again.

After the operation requestor for confirmation 442 sends the operation request data for confirmation to the candidate target apparatus, the user confirmation receiver 443 pop-up displays the confirmation reception screen (see FIG. 9) over the apparatus list screen on the display 40 (Step S207). Here, the user presses the button "YES" on the confirmation reception screen when the user successfully confirmed the execution of the above-mentioned operation for confirmation by the intended apparatus 2, and presses the button "NO" when the user failed to confirm the execution.

As the button "YES" is pressed (Step S208; YES), the user confirmation receiver 443 identifies the apparatus 2 that executed the operation for confirmation, namely the candidate target apparatus as the work-target apparatus 2 intended by the user (the work-target apparatus) (Step S209), and ends the target apparatus identification process. In such a case, for example, the user confirmation receiver 443 saves the apparatus identification number of the identified apparatus 2 in the RAM or the like in association with information indicating a work-target apparatus.

On the other hand, if the button "NO" is pressed (Step S208; NO), the processing of the controller 44 returns to Step S204. In such a case, the user can designate another apparatus identification number and request execution of an operation for confirmation again. For example, the user can select an apparatus 2 of which the degree of nearness is one-rank lower than that of the previous candidate target apparatus as a candidate target apparatus and request execution of an operation for confirmation.

With the above-described target apparatus identification process, after a work-target apparatus is identified, the apparatus controller 444 displays a non-depicted operation screen on the display 40. Through that operation screen, the user can make the work-target apparatus execute an intended operation or enter intended settings on the work-target apparatus.

As described above, in the network system according to Embodiment 1 of the present disclosure, the portable terminal device 4 orders each apparatus 2 to measure the reception electric field intensity and collects the measurement result (the reception electric field intensity) from each apparatus 2 according to the user operation. Then, the portable terminal device 4 calculates the degree of nearness of each apparatus 2 based on the collected reception electric field intensities of the apparatuses 2 and presents to the user an apparatus list on which the apparatus identification numbers of the respective apparatuses 2 are arranged in the descending order of calculated degrees of nearness. Here, the user can select any apparatus identification number from the apparatus list and make the apparatus 2 having the selected apparatus identification number execute an operation for confirmation.

For example, the user can designate the first apparatus identification number on the apparatus list when the user intends an apparatus 2 nearest to the current location of the user as the work target, and select the second apparatus identification number on the apparatus list when the user intends a second nearest apparatus 2 as the work target. Then, as the apparatus 2 having the selected apparatus identification number executes an operation for confirmation and the user approves it, the portable terminal device 4 identifies the apparatus 2 as the work-target apparatus.

As described above, the network system according to Embodiment 1 of the present disclosure can identify an apparatus 2 that the user intends to work on (a work-target apparatus) without forcing the user to do some cumbersome work. Moreover, there is no need to restrict the wireless communication range between the portable terminal device 4 and each apparatus 2, and an apparatus 2 can easily be identified as the work-target apparatus without causing the user any trouble even if, for example, the work-target apparatus 2 is installed on a ceiling.

Moreover, execution of an operation for confirmation allows the user to actually check whether it is the intended apparatus 2, whereby the work-target apparatus can be identified with accuracy.

Moreover, the portable terminal device 4 may provide an environment in which the user can enter intended information regarding the apparatus 2 identified as the work target of the user. In such a case, for example, the controller 44 of the portable terminal device 4 displays on the display 40 a screen for receiving input of information regarding the identified apparatus 2 from the user (an apparatus information input screen). The user can enter information regarding the installation location, information regarding maintenance works, and the like via the apparatus information input screen.

As the user has completed input operation via the apparatus information input screen, the portable terminal device 4 creates apparatus information associating the entered information with the apparatus identification number and saves the apparatus information in the data storage 43. This apparatus information can be used as information of the apparatuses 2 managed by the system controller 1. For example, the controller 44 of the portable terminal device 4 sends the apparatus information saved in the data storage 43 to the system controller 1 via the communicator 42 according to the user operation. The system controller 1 registers the apparatus information sent from the portable terminal device 4 in an apparatus management database (not depicted) constructed in the data storage 13.

Moreover, in this embodiment, the apparatus list screen (see FIG. 8) displays a list of apparatus identification numbers. However, it is not always necessary to display the apparatus identification numbers. For example, a list of apparatuses numbered 1, 2, 3, . . . in the descending order of the degrees of nearness may be displayed.

Moreover, in this embodiment, the portable terminal device 4 sends operation request data for confirmation to the apparatus 2 designated by the user on the apparatus list screen (see FIG. 8). However, the portable terminal device 4 may automatically send operation request data for confirmation to the apparatus 2 with the highest degree of nearness. In such a case, the portable terminal device 4 may send operation request data for confirmation to the apparatus 2 of which the degree of nearness is one-rank lower than that of the previous one each time the user presses the button "NO" on the confirmation reception screen (see FIG. 9).

Moreover, when the system controller 1 and each apparatus 2 conduct data communication in compliance with a predetermined wireless communication scheme, the portable terminal device 4 and each apparatus 2 may conduct data communication in compliance with a similar wireless communication scheme. In this way, each apparatus 2 does not need to comprise a communication interface (a second communicator 21 in FIG. 4) dedicated to communication with the portable terminal device 4, whereby the manufacturing cost can be reduced.

(Modification 1)

Modification 1 of this embodiment is described. In this modification, the portable terminal device 4 measures the reception electric field intensity in wireless communication with each apparatus 2.

Figure 11:
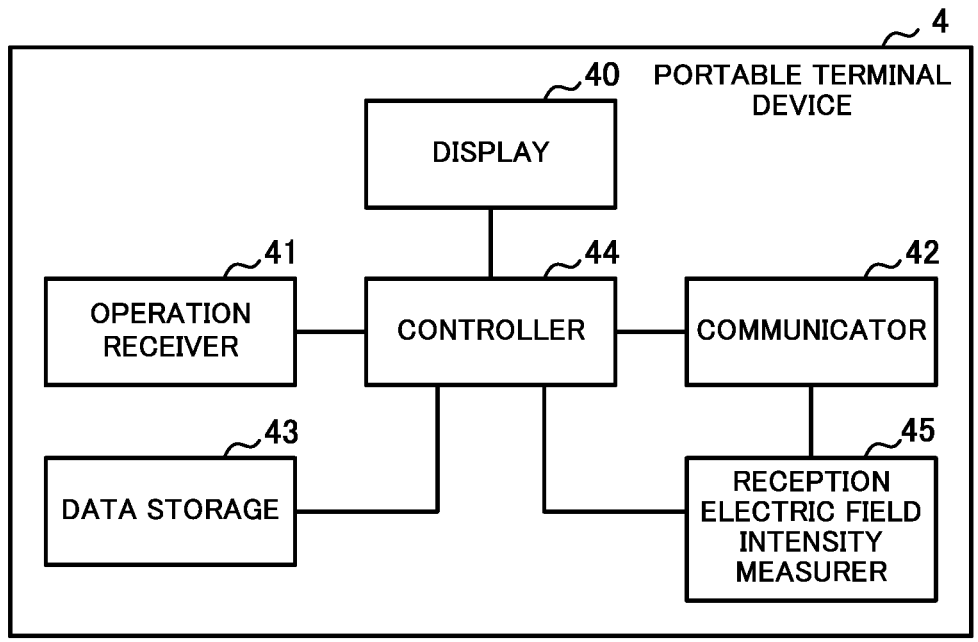
FIG. 11 is a block diagram showing a configuration of a portable terminal device in Modification 1 of Embodiment 1.

FIG. 11 is a block diagram showing the configuration of the portable terminal device 4 in Modification 1 of this embodiment. The portable terminal device 4 in Modification 1 additionally includes a reception electric field intensity measurer 45. The reception electric field intensity measurer 45 measures the electric field intensity at the time of wireless data reception from each apparatus 2.

Figure 12:
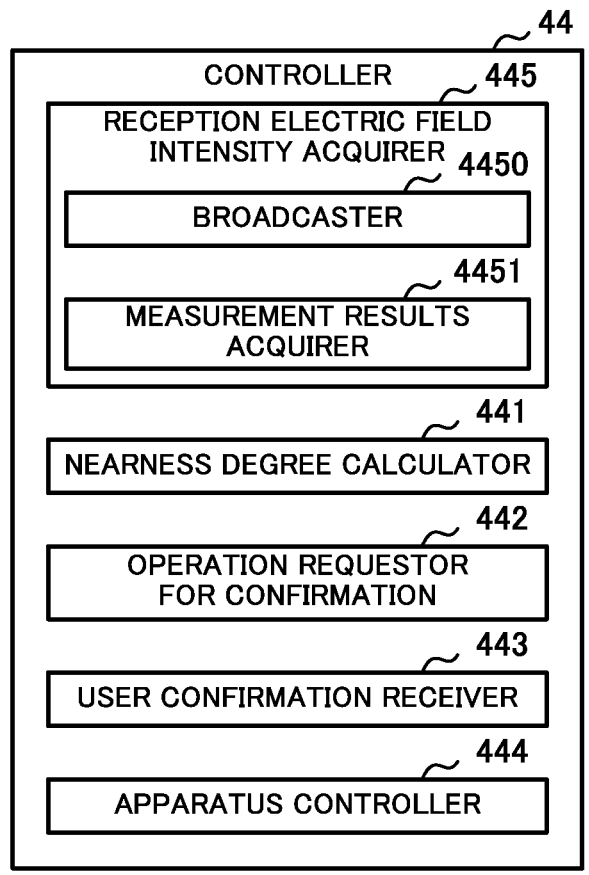
FIG. 12 is a block diagram showing a functional configuration of a controller of the portable terminal device in Modification 1 of Embodiment 1.

FIG. 12 is a block diagram showing the functional configuration of the controller 44 of the portable terminal device 4 in this modification. In this modification, the controller 44 includes a reception electric field intensity acquirer 445 in place of the reception electric field intensity acquirer 440. The reception electric field intensity acquirer 445 includes a broadcaster 4450 and a measurement results acquirer 4451.

As the user presses the button "YES" on the measurement start inquiry screen (see FIG. 7), the broadcaster 4450 broadcasts data (response request data) for requesting transmission of response data (any content) to the apparatuses 2.

Upon receiving the response data from an apparatus 2 via the communicator 42, the measurement results acquirer 4451 acquires a measurement result of the reception electric field intensity measurer 45 (namely the reception electric field intensity) and saves the measurement result in the RAM or the like in association with the apparatus identification number contained in the received response data. The measurement results acquirer 4451 continues to wait for reception of response data from the apparatuses 2 until the elapsed time since the response request data was broadcasted (the reception wait time) has reached a preset time (a reception time-out period). Then, as the reception wait time has reached the reception time-out period, the measurement results acquirer 4451 notifies the nearness degree calculator 441 that measurement of the reception electric field intensities is completed. The subsequent processing is similar to the processing in Embodiment 1 (Steps S203 to S209 in FIG. 10).

As described above, in Modification 1 of Embodiment 1, the portable terminal device 4 measures the reception electric field intensities, whereby the apparatuses 2 do not need to comprise any hardware dedicated to measuring the reception electric field intensity (the reception electric field intensity measurer 24 in FIG. 4). Moreover, the apparatuses 2 need only to have the capability of sending some response to the request from the portable terminal device 4. In other words, in this Modification 1, the apparatuses 2 do not need to execute the processing specialized for the present disclosure such as creating and sending measurement data. Therefore, any equipment apparatus comprising a wireless communicator can be used as an apparatus constituting the network system of the present disclosure, whereby the present disclosure could easily be installed.

(Modification 2)

Modification 2 of this embodiment is described. In this modification, the portable terminal device 4 calculates the degree of nearness of each apparatus 2 based on the transmission delay time in wireless communication with each apparatus 2.

Figure 13:
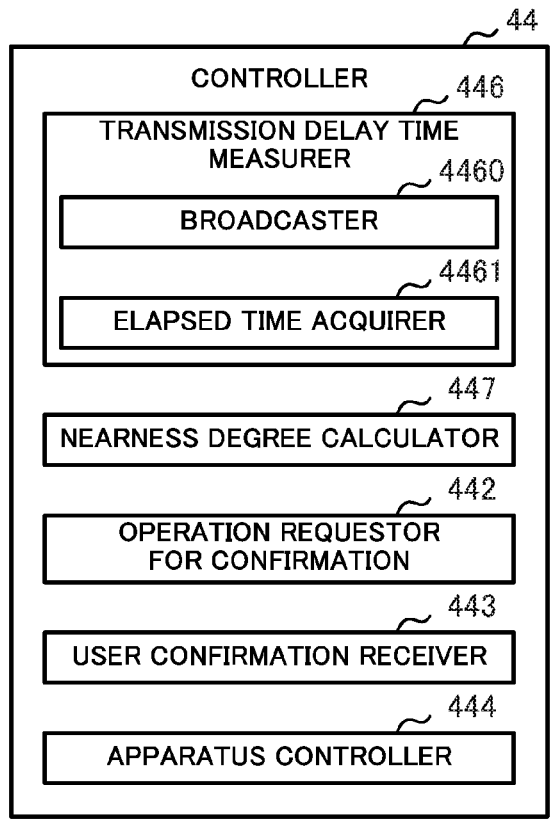
FIG. 13 is a block diagram showing a functional configuration of a controller of a portable terminal device in Modification 2 of Embodiment 1.

The portable terminal device 4 of this modification has a similar configuration as the configuration in Embodiment 1 (see FIG. 5). However, the function of the controller 44 of the portable terminal device 4 in this modification is different in part from that of the controller 44 in Embodiment 1. FIG. 13 is a block diagram showing the functional configuration of the controller 44 of the portable terminal device 4 in this modification. In this modification, the controller 44 includes a transmission delay time measurer 446 in place of the reception electric field intensity acquirer 440 and a nearness degree calculator 447 in place of the nearness degree calculator 441.

The transmission time delay measurer 446 includes a broadcaster 4460 and an elapsed time acquirer 4461. As the user presses the button "YES" on the measurement start inquiry screen (see FIG. 7), the broadcaster 4460 broadcasts response request data to the apparatuses 2 similar to the broadcaster 4450 in Modification 1.

Upon receiving response data from an apparatus 2 via the communicator 42, the elapsed time acquirer 4461 acquires the elapsed time up to the current time since the response request data was broadcasted and saves the acquired elapsed time in the RAM or the like in association with the apparatus identification number contained in the received response data on the assumption that the acquired elapsed time is the transmission delay time in wireless communication with the apparatus 2. As in Modification 1, the elapsed time acquirer 4461 continues to wait for reception of response data from the apparatuses 2 until the reception wait time has reached a reception time-out period. Then, as the reception wait time has reached the reception time-out period, the elapsed time acquirer 4461 notifies the nearness degree calculator 447 that measurement of the transmission delay time is completed.

Upon receiving the above-mentioned notification from the elapsed time acquirer 4461, the nearness degree calculator 447 calculates the degree of nearness of each apparatus 2 based on the transmission delay time of each apparatus 2. The transmission delay time is increased in proportion to the distance between the portable terminal device 4 and each apparatus 2, whereby the degree of nearness can be calculated based on the transmission delay time.

Then, the nearness degree calculator 447 creates an apparatus list as in Embodiment 1 based on the calculated degrees of nearness of the apparatuses 2. The subsequent processing is similar to the processing described in Embodiment 1 (Steps S204 to S209 in FIG. 10).

As described above, in Modification 2 of Embodiment 1, the portable terminal device 4 calculates the degree of nearness of each apparatus 2 based on the transmission delay time in wireless communication with each apparatus 2. In doing so, the transmission delay times of the apparatuses 2 are each determined based on the response data having first reached the portable terminal device 4. Unlike the reception electric field intensities, the transmission delay times of the apparatuses 2 determined as described above do not fluctuate largely due to interference, whereby the accuracy of calculation of the degrees of nearness can be improved.

Embodiment 2

The network system according to Embodiment 2 of the present disclosure is described next. In the following description, the same components as in Embodiment 1 are referred to by the same reference numbers and their explanations are omitted. In the network system of Embodiment 1, the portable terminal device 4 executes the process to identify an apparatus 2 that the user intends to work on (a work-target apparatus) (the target apparatus identification process). On the other hand, in the network system of Embodiment 2, the portable terminal device 4 and system controller 1 cooperate to execute the target apparatus identification process.

Figure 14:
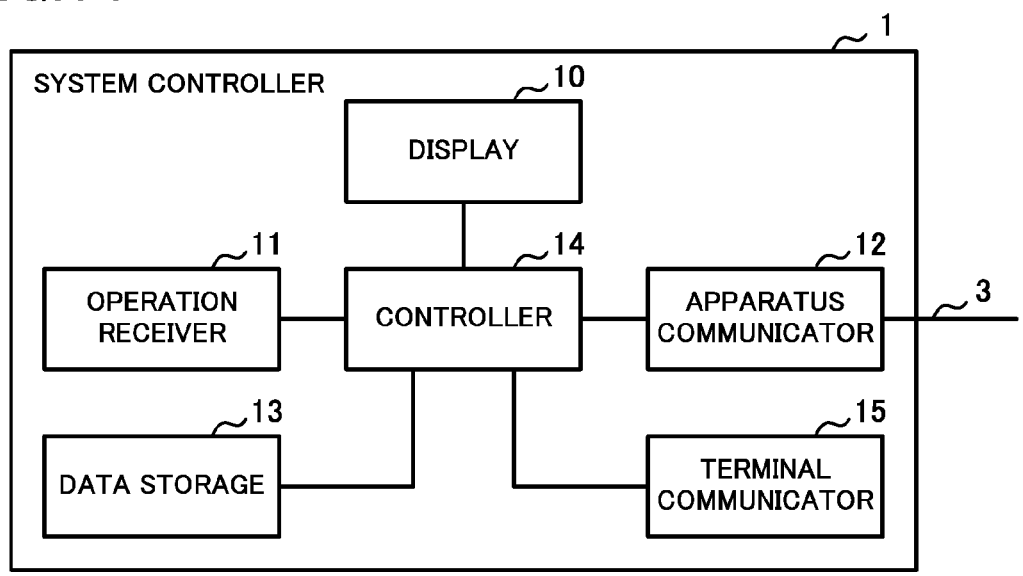
FIG. 14 is a block diagram showing a configuration of a system controller in Embodiment 2.

FIG. 14 is a block diagram showing the configuration of the system controller 1 in Embodiment 2. As understood from this figure, the system controller 1 in Embodiment 2 additionally includes a terminal communicator 15 in addition to the configuration of the system controller 1 in Embodiment 1. The terminal communicator 15 includes a predetermined wireless communication interface and conducts data communication with the portable terminal device 4 in compliance with a predetermined communication scheme under the control of the controller 14.

The apparatuses 2 in Embodiment 2 have a similar configuration as the configuration in Embodiment 1 (see FIG. 4). However, upon receiving measurement request data from the portable terminal device 4 via the second communicator 21, the controller 25 of each apparatus 2 sends measurement data containing a measurement result of the reception electric field intensity measurer 24 to the system controller 1 via the first communicator 20.

Figure 15:
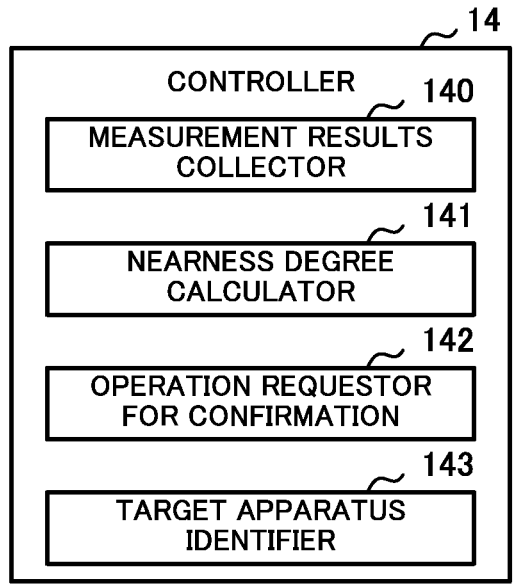
FIG. 15 is a block diagram showing a functional configuration of a controller of the system controller in Embodiment 2.

FIG. 15 is a block diagram showing the functional configuration of the controller 14 of the system controller 1 in Embodiment 2. The controller 14 in Embodiment 2 includes a measurement results collector 140, a nearness degree calculator 141, an operation requestor for confirmation 142, and a target apparatus identifier 143. The functions of these components are realized by the CPU or the like of the controller 14 executing a target apparatus identification process program stored in the data storage 13. Moreover, although not depicted, the controller 14 includes functioning parts intrinsic to the system controller of this kind of equipment apparatus systems, for example functioning parts for monitoring the operation states of the apparatuses 2 and controlling the apparatuses 2.

The measurement results collector 140 collects measurements result of the reception electric field intensity of each apparatus 2. More specifically, the measurement results collector 140 receives measurement data from the apparatuses 2 via the apparatus communicator 12 and extracts the measurement result (namely the reception electric field intensity) from each of the received measurement data. The measurement results collector 140 saves the extracted reception electric field intensities of the apparatuses 2 in the RAM or the data storage 13.

The nearness degree calculator 141 calculates the degree of nearness of each apparatus 2 based on the reception electric field intensity of each apparatus 2 collected by the measurement results collector 140. Moreover, the nearness degree calculator 141 creates a list on which the apparatus identification numbers of the respective apparatuses 2 are arranged in the descending order of calculated degrees of nearness (an apparatus list). The nearness degree calculator 141 sends data containing the created apparatus list (apparatus list data) to the portable terminal device 4 via the terminal communicator 15.

The operation requestor for confirmation 142 requests the apparatus 2 designated by the user via the portable terminal device 4 to execute an operation for confirmation. More specifically, upon receiving request order data, which is described below, via the terminal communicator 15, the operation requestor for confirmation 142 sends operation request data for confirmation for requesting execution of an operation for confirmation to the apparatus 2 having the apparatus identification number contained in the request order data via the apparatus communicator 12.

If the user has conducted an operation to confirm the above-mentioned operation for confirmation via the portable terminal device 4, the target apparatus identifier 143 identifies the above-mentioned apparatus 2, namely the apparatus 2 to which the operation request data for confirmation was sent as the apparatus 2 that the user intends to work on (namely the work-target apparatus). More specifically, upon receiving apparatus identification order data, which is described below, from the portable terminal device 4 via the terminal communicator 15, the target apparatus identifier 143 identifies the apparatus 2 having the apparatus identification number contained in the received apparatus identification order data as the work-target apparatus. In such a case, the target apparatus identifier 143 saves the apparatus identification number of the identified apparatus 2 in the RAM or the data storage 13 in association with information indicating a work-target apparatus.

Figure 16:
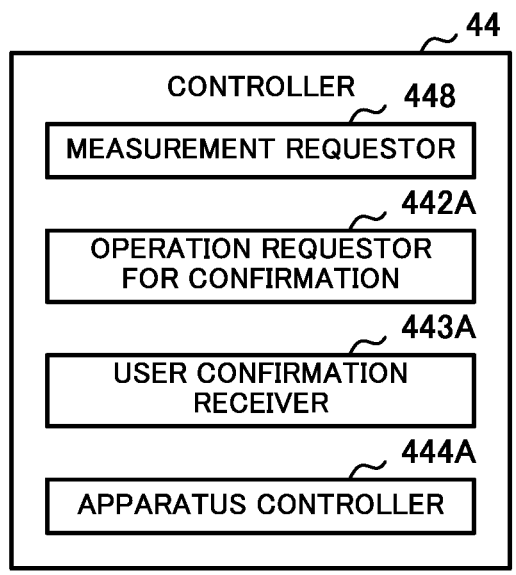
FIG. 16 is a block diagram showing a functional configuration of a controller of a portable terminal device in Embodiment 2.

The portable terminal device 4 in Embodiment 2 has a similar configuration as the configuration in Embodiment 1 (see FIG. 5). However, the function of the controller 44 of the portable terminal device 4 in Embodiment 2 is different from that of the controller 44 of the portable terminal device 4 in Embodiment 1. FIG. 16 is a block diagram showing the functional configuration of the controller 44 of the portable terminal device 4 in Embodiment 2. The controller 44 in Embodiment 2 includes a measurement requestor 448, an operation requestor for confirmation 442A, a user confirmation receiver 443A, and an apparatus controller 444A.

As the user presses the button "YES" on the measurement start inquiry screen (see FIG. 7), the measurement requestor 448 broadcasts measurement request data to the apparatuses 2 via the communicator 42 similar to the measurement requestor 4400 of the reception electric field intensity acquirer 440 in Embodiment 1.

The operation requestor for confirmation 442A receives from the user designation of an apparatus 2 to request execution of an operation for confirmation (a candidate target apparatus). More specifically, the operation requestor for confirmation 442A displays on the display 40 a similar apparatus list screen as in Embodiment 1 (see FIG. 8) using the apparatus list data received from the system controller 1 via the communicator 42.

As the user presses the button "EXECUTE" on the apparatus list screen, the operation requestor for confirmation 442A sends request order data containing the apparatus identification number designated by the user to the system controller 1 via the communicator 42. The request order data is data for ordering the system controller 1 to request the apparatus 2 having the apparatus identification number designated by the user (namely a candidate target apparatus) to execute an operation for confirmation.

Moreover, as the user presses the button "CANCEL" on the apparatus list screen in FIG. 8, the measurement start inquiry screen (see FIG. 7) is displayed again as in Embodiment 1.

After the operation requestor for confirmation 442A sends the request order data to the system controller 1, the user confirmation receiver 443A pop-up displays a similar confirmation reception screen as in Embodiment 1 (see FIG. 9) over the apparatus list screen on the display 40.

As the user presses the button "YES" on the confirmation reception screen, the user confirmation receiver 443A sends apparatus identification order data containing the apparatus identification number designated earlier by the user on the apparatus list screen (see FIG. 8) to the system controller 1 via the communicator 42. The apparatus identification order data is data for ordering the system controller 1 to identify the apparatus 2 of which the operation for confirmation was confirmed by the user as the apparatus 2, to work on, intended by the user (namely the work-target apparatus).

In the network system of this embodiment, the function realized by cooperation of the operation requestor for confirmation 442A of the controller 44 of the portable terminal device 4 and the operation requestor for confirmation 142 of the controller 14 of the system controller 1 corresponds to the operation request means in the present disclosure. Moreover, the function realized by cooperation of the user confirmation receiver 443A of the controller 44 and the target apparatus identifier 143 of the controller 14 corresponds to the apparatus identification means in the present disclosure.

Figure 17:
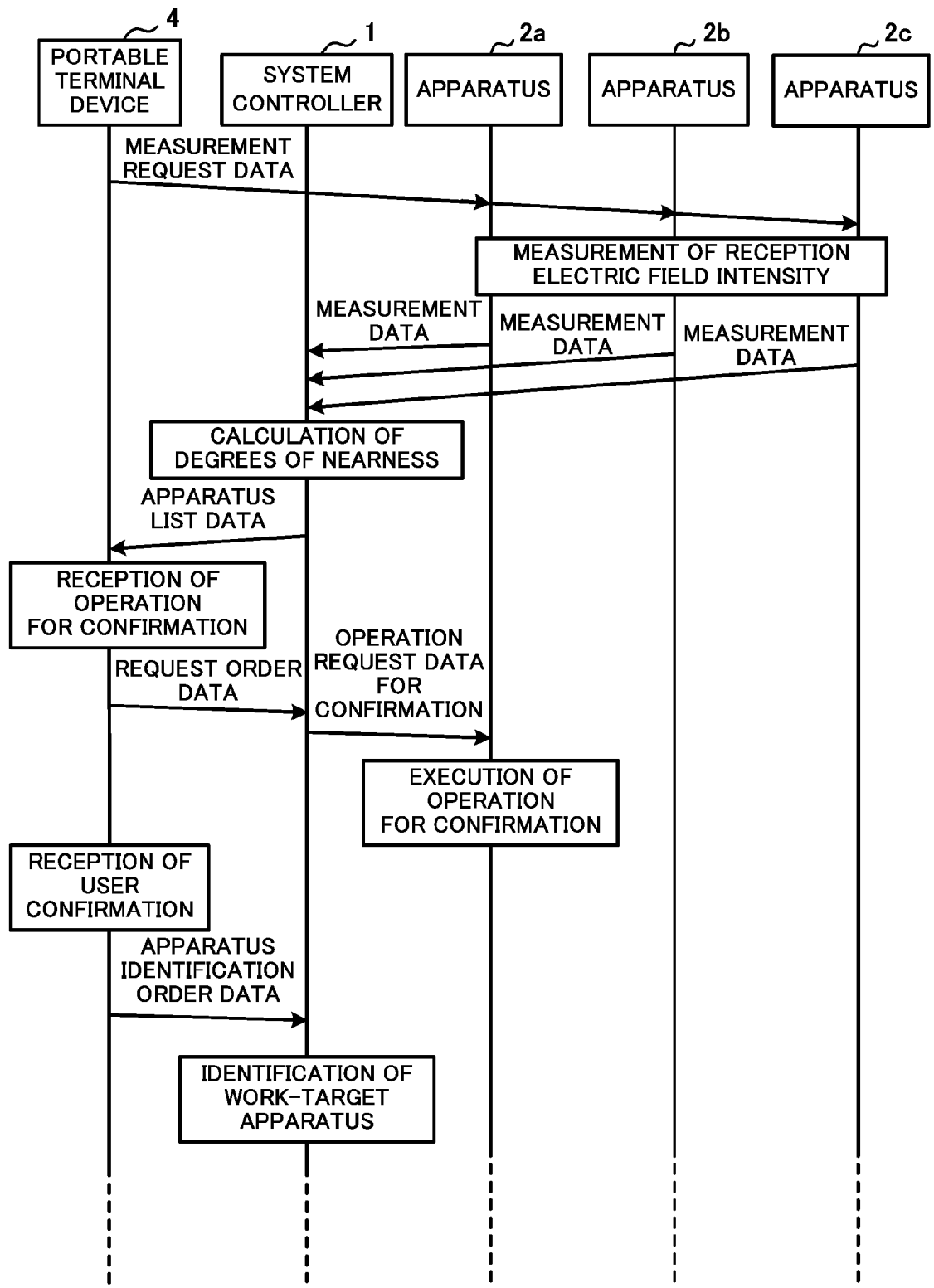
FIG. 17 is an illustration showing a communication sequence in a target apparatus identification process in Embodiment 2.

FIG. 17 shows the communication sequence in the target apparatus identification process in Embodiment 2.

The network system according to Embodiment 2 of the present disclosure can yield a similar effect as the network system of Embodiment 1. In other words, it is possible to identify an apparatus 2 that the user intends to work on (a work-target apparatus) without forcing the user to do some cumbersome work. Moreover, there is no need to restrict the wireless communication range between the portable terminal device 4 and each apparatus 2, and an apparatus 2 can easily be identified as the work-target apparatus without causing the user any trouble even if, for example, the work-target apparatus 2 is installed on a ceiling.

Moreover, execution of an operation for confirmation allows the user to actually check whether it is the intended apparatus 2, whereby the work-target apparatus can be identified with accuracy.

Furthermore, in this embodiment, the system controller 1 executes heavy workload tasks such as collection of the reception electric field intensities and calculation of the degrees of nearness. Therefore, the portable terminal device 4 has only to execute tasks regarding display of information created by the system controller 1 and input to the system controller 1. Therefore, it is possible to realize the portable terminal device 4 in this embodiment using a portable device with a relatively few calculation resource. Moreover, for a similar reason, even a portable device carrying a different CPU and/or an operation system (OS) can easily realize the same function as the portable terminal device 4 in this embodiment.

Moreover, the portable terminal device 4 may provide an environment in which the user can enter intended information regarding the apparatus 2 identified as the work target of the user. In such a case, for example, the controller 44 of the portable terminal device 4 displays on the display 40 a screen for receiving input of information regarding the identified apparatus 2 from the user (an apparatus information input screen). The user can enter, for example, information regarding the installation location, information regarding maintenance works, and the like via the apparatus information input screen.

As the user has completed input operation via the apparatus information input screen, the portable terminal device 4 creates apparatus information associating the entered information with the apparatus identification number and saves the apparatus information in the data storage 43. This apparatus information can be used as information of the apparatuses 2 managed by the system controller 1. For example, the controller 44 of the portable terminal device 4 sends the apparatus information saved in the data storage 43 to the system controller 1 via the communicator 42 according to the user operation. The system controller 1 registers the apparatus information sent from the portable terminal device 4 in an apparatus management database (not depicted) constructed in the data storage 13.

Moreover, in this embodiment, the system controller 1 sends operation request data for confirmation to the apparatus 2 designated with request order data when the system controller 1 receives the request order data from the portable terminal device 4. However, the system controller 1 may automatically send operation request data for confirmation. In such a case, the system controller 1 first sends operation request data for confirmation to the apparatus 2 with the highest degree of nearness. Then, the system controller 1 may send operation request data for confirmation to the apparatus 2 of which the degree of nearness is one-rank lower than that of the previous one each time the user presses the button "NO" on the confirmation reception screen (see FIG. 9).

Moreover, when the system controller 1 and each apparatus 2 conduct data communication in compliance with a predetermined wireless communication scheme, the portable terminal device 4 and each apparatus 2, and the portable terminal device 4 and the system controller 1 may conduct data communication in compliance with a similar wireless communication scheme. In this way, neither the system controller 1 nor the apparatuses 2 need to comprise a communication interface dedicated to communication with the portable terminal device 4 (the second communicator 21 in FIG. 4 and the terminal communicator 15 in FIG. 14), whereby their manufacturing cost can be reduced.

Figure 18:
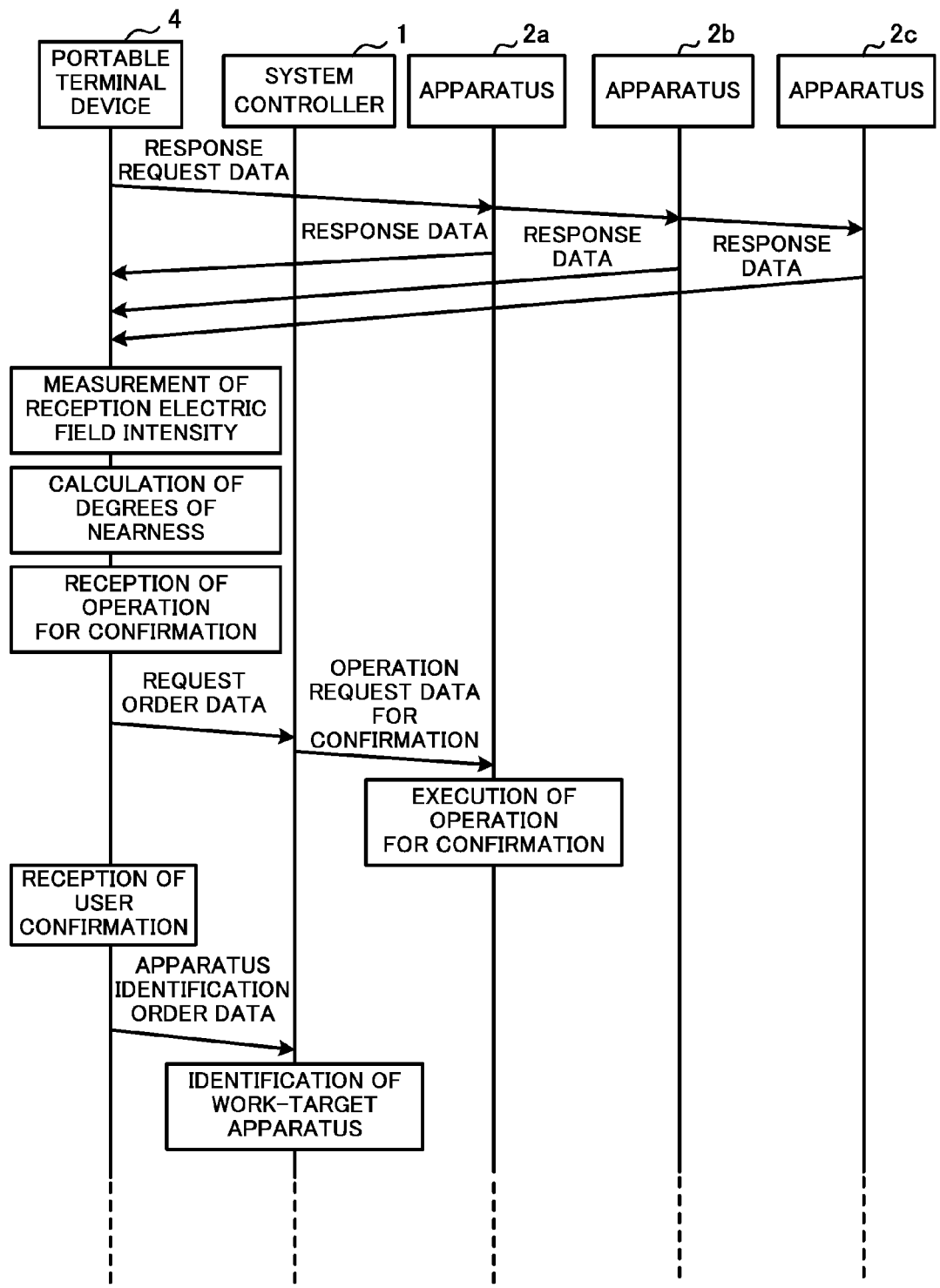
FIG. 18 is an illustration showing a communication sequence in a target apparatus identification process in a modification of Embodiment 2.

Moreover, the portable terminal device 4 may measure the reception electric field intensity in wireless communication with each apparatus 2 and calculates the degree of nearness. FIG. 18 shows an example of a communication sequence in the target apparatus identification process in such a case.

Moreover, the portable terminal device 4 may calculate the degree of nearness of each apparatus 2 based on the transmission delay time in wireless communication with each apparatus 2.

Embodiment 3

The network system according to Embodiment 3 of the present disclosure is described next. In the following description, the same components as in Embodiment 1 are referred to by the same reference numbers and their explanations are omitted.

Figure 19:
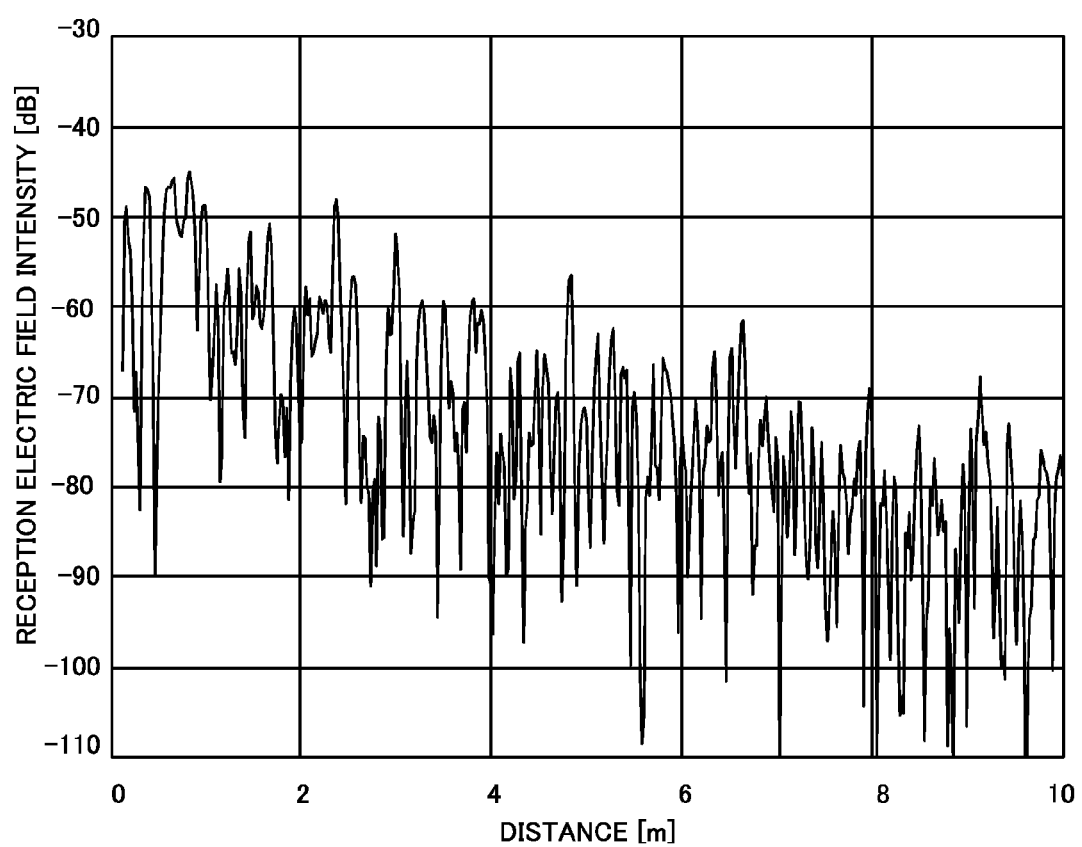
FIG. 19 is a graph for explaining a change in reception electric field intensity under the influence of multiple paths in Embodiment 3.

In the network system of Embodiment 1, the portable terminal device 4 calculates the degree of nearness of each apparatus 2 based on one measurement of the reception electric field intensity of each apparatus 2. However, there is a concern with reduction in the accuracy of calculated degrees of nearness in an environment where even a small shift of the measuring point causes the reception electric field intensity to largely fluctuate under the influence of multiple paths as shown in FIG. 19.

On the other hand, in the network system of Embodiment 3, the portable terminal device 4 calculates the degree of nearness of each apparatus 2 based on multiple measurements of the reception electric field intensity of each apparatus 2.

Figure 20:
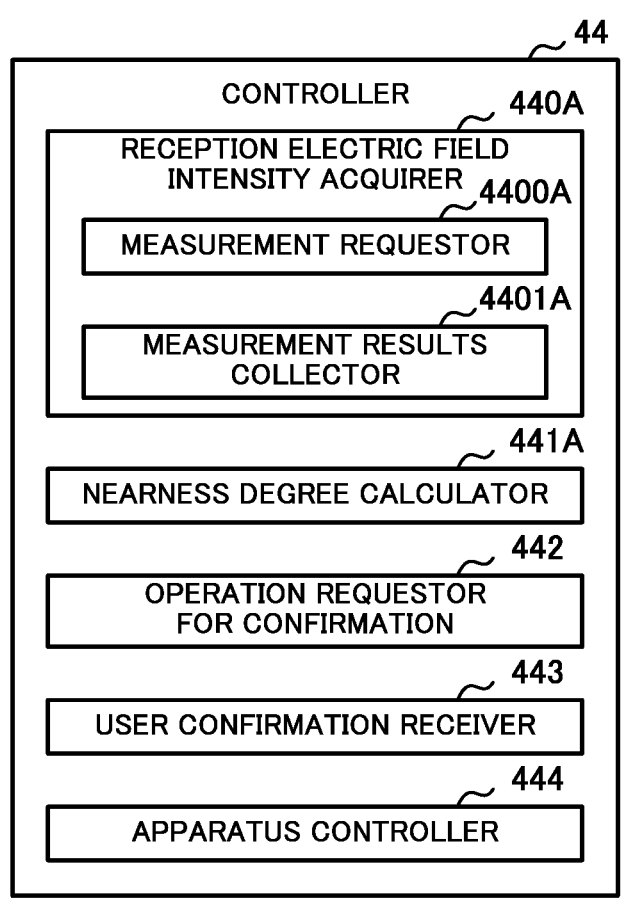
FIG. 20 is a block diagram showing a functional configuration of a controller of a portable terminal device in Embodiment 3.

The portable terminal device 4 in Embodiment 3 has a similar configuration as the configuration in Embodiment 1 (see FIG. 5). However, the function of the controller 44 of the portable terminal device 4 in Embodiment 3 is different in part from that of the controller 44 in Embodiment 1. The controller 44 in Embodiment 3 includes, as shown in FIG. 20, a reception electric field intensity acquirer 440A, a nearness degree calculator 441A, an operation requestor for confirmation 442, a user confirmation receiver 443, and an apparatus controller 444.

The reception electric field intensity acquirer 440A acquires multiple measurement results of the reception electric field intensity of each apparatus 2. In more detail, the reception electric field intensity acquirer 440A includes a measurement requestor 4400A and a measurement results collector 4401A. The measurement requestor 4400A requests the apparatuses 2 to measure the reception electric field intensity multiple times (for example, three times) intermittently. More specifically, the measurement requestor 4400A broadcasts measurement request data to the apparatuses 2 each time the user presses a button "START" on first to third measurement confirmation screens as shown in FIGS. 21 to 23.

Each time the measurement requestor 4400A sends measurement request data as described above, the measurement results collector 4401A collects the reception electric field intensities sent from the apparatuses 2. More specifically, the measurement results collector 4401A receives measurement data sent from the apparatuses 2 in response to first measurement request data (first measurement data) via the communicator 42 and extracts measurement results (namely first reception electric field intensities) from the received, first measurement data. The measurement results collector 4401A saves the extracted, first reception electric field intensity of each apparatus 2 in the RAM or the like.

Similarly, the measurement results collector 4401A collects and saves in the RAM or the like second and third reception electric field intensities of each apparatus 2.

The nearness degree calculator 441A calculates the degree of nearness of each apparatus 2 based on the first to the third reception electric field intensities of each apparatus 2 collected by the measurement results collector 4401A. More specifically, the nearness degree calculator 441A first acquires a representative value for the reception electric field intensities of each apparatus 2. For example, the nearness degree calculator 441A may use the highest value among the first to the third reception electric field intensities as the representative value or use the median of the first to the third reception electric field intensities as the representative value.

Then, the nearness degree calculator 441A calculates the degree of nearness of each apparatus 2 based on the acquired representative value of each apparatus 2 and creates an apparatus list as in Embodiment 1.

The details of processing by the operation requestor for confirmation 442, the user confirmation receiver 443, and the apparatus controller 444 are similar to those described in Embodiment 1.

Figure 24:
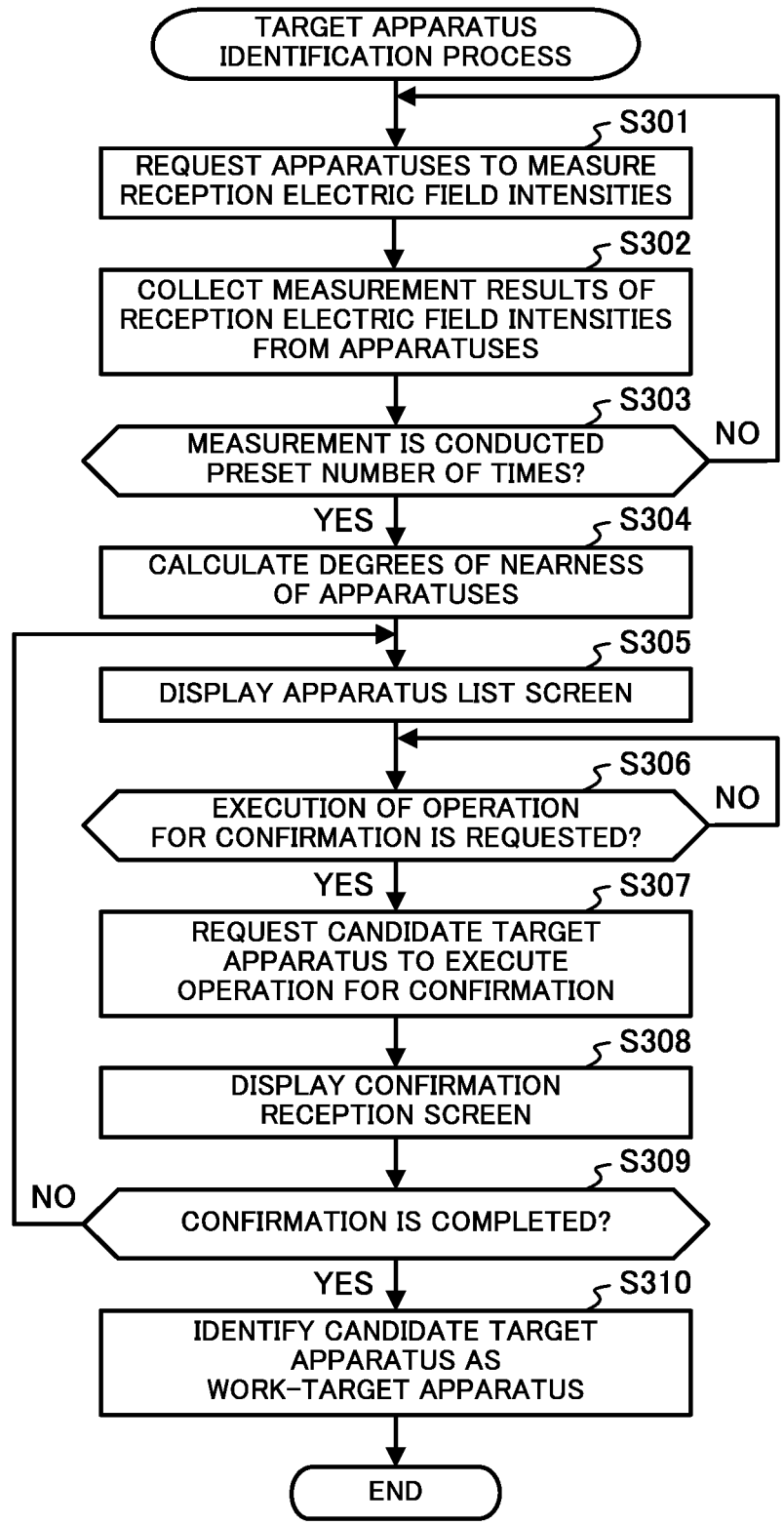
FIG. 24 is a flowchart showing a procedure of a target apparatus identification process in Embodiment 3.

FIG. 24 is a flowchart showing the procedure of the target apparatus identification process executed by the controller 44 of the portable terminal device 4 in Embodiment 3. This target apparatus identification process starts as the user presses the button "YES" on the measurement start inquiry screen (see FIG. 7) after the target apparatus identification process program is activated as in Embodiment 1.

In Steps S301 to S303, the measurement requestor 4400A displays the first to the nth (the third in this example) measurement confirmation screens (see FIGS. 21 to 23) in sequence, and broadcasts measurement request data to the apparatuses 2 each time the user presses the button "START." The measurement confirmation screens display information regarding a measuring point recommended to the user (a recommended measuring point). As shown in FIGS. 21 to 23, the first to the third measurement confirmation screens show different recommended measuring points. In this way, it is possible to urge the user to change the position of the portable terminal device 4 at each measurement.

The measurement results collector 4401A receives measurement data from each apparatus 2 via the communicator 42 and collects a measurement result (namely the reception electric field intensity) contained in the received measurement data. The measurement results collector 4401A continues to wait, as in Embodiment 1, for reception of measurement data from the apparatuses 2 until the elapsed time since the measurement request data was broadcasted (the reception wait time) has reached a preset time (a reception time-out period). The measurement results collector 4401A executes the above-mentioned collection a preset number of times (three times in this example).

After the third collection is completed (Step S303; YES), the nearness degree calculator 441A calculates the degree of nearness of each apparatus 2 as described above and creates an apparatus list (Step S304).

The following processing of Steps S305 to S310 is similar to the processing in the target apparatus identification process in Embodiment 1 (Steps S204 to S209 in FIG. 10).

The network system according to Embodiment 3 of the present disclosure can yield a similar effect as the network system of Embodiment 1. In other words, an apparatus 2 that the user intends to work on (a work-target apparatus) can be identified without forcing the user to do some cumbersome work. Moreover, there is no need to restrict the wireless communication range between the portable terminal device 4 and each apparatus 2, and an apparatus 2 can easily be identified as the work-target apparatus without causing the user any trouble even if, for example, the work-target apparatus 2 is installed on a ceiling.

Moreover, execution of an operation for confirmation allows the user to actually check whether it is the intended apparatus 2, whereby the work-target apparatus can be identified with accuracy.

Furthermore, according to the network system of Embodiment 3, the portable terminal device 4 calculates the degree of nearness of each apparatus 2 based on multiple measurements of the reception electric field intensity of each apparatus 2. Moreover, the portable terminal device 4 displays on a screen a message urging to change the measuring point before starting each measurement. Therefore, reduction in the accuracy of calculation of the degrees of nearness can be prevented even in an indoor environment vulnerable to influence of multiple paths, whereby the work-target apparatus can be identified with accuracy.

(Modification 1)

Modification 1 of this embodiment is described. In this modification, the portable terminal device 4 measures the reception electric field intensity in wireless communication with each apparatus 2.

The portable terminal device 4 in Modification 1 of Embodiment 3 has a similar configuration as the configuration of the portable terminal device 4 in Modification 1 of Embodiment 1 (see FIG. 11). However, the function of the controller 44 of the portable terminal device 4 in this modification is different in part from that of the controller 44 in Modification 1 of Embodiment 1 (see FIG. 12).

Figure 25:
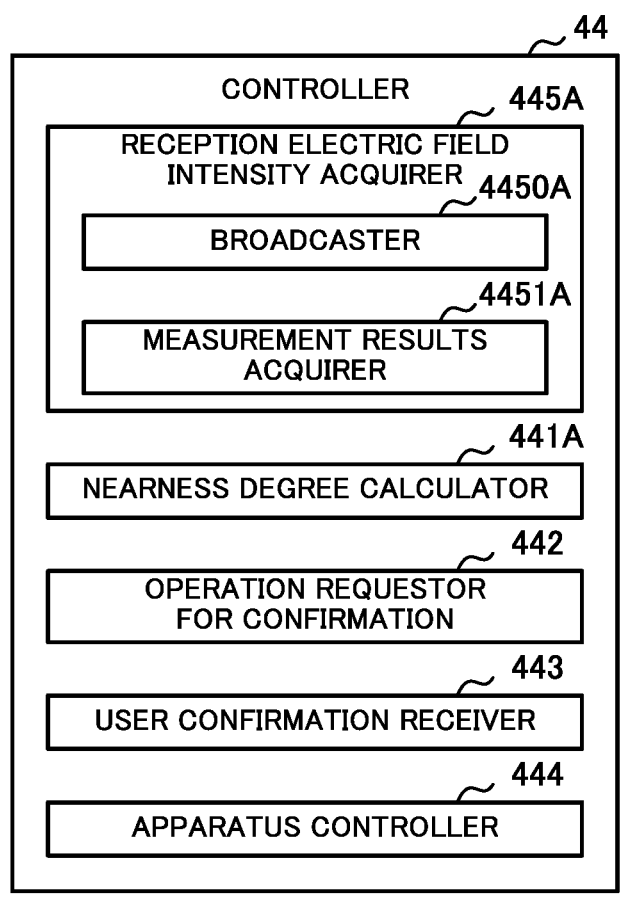
FIG. 25 is a block diagram showing a functional configuration of a controller of a portable terminal device in Modification 1 of Embodiment 3.

FIG. 25 is a block diagram showing the functional configuration of the controller 44 of the portable terminal device 4 in this modification. In this modification, the controller 44 includes a reception electric field intensity acquirer 445A in place of the reception electric field intensity acquirer 445 and a nearness degree calculator 441A in place of the nearness degree calculator 441.

The reception electric field intensity acquirer 445A includes a broadcaster 4450A and a measurement results acquirer 4451A. The broadcaster 4450A requests, multiple times, the apparatuses 2 to transmit response data (any content) (for example, three times) intermittently. More specifically, the broadcaster 4450A broadcasts to the apparatuses 2 data for requesting transmission of response data (response request data) each time the user presses the button "START" on the first to the third measurement confirmation screens as shown in FIGS. 21 to 23.

Each time the broadcaster 4450A sends response request data as described above, the measurement results acquirer 4451A acquires measurement results of the reception electric field intensity measurer 45 based on response data sent from the apparatuses 2. More specifically, the measurement results acquirer 4451A receives response data (first response data) sent from the apparatuses 2 in response to first response request data via the communicator 42. Then, the measurement results acquirer 4451A acquires measurement results (namely first reception electric field intensities) of the reception electric field intensity measurer 45 and saves the measurement results in the RAM or the like in association with the apparatus identification numbers contained in the received, first response data.

Similarly, the measurement results acquirer 4451A acquires from the reception electric field intensity measurer 45 and saves in the RAM or the like the reception electric field intensities based on reception of second and third response data from each apparatus 2.

The details of processing by the nearness degree calculator 441A, the operation requestor for confirmation 442, the user confirmation receiver 443, and the apparatus controller 444 are similar to those described in Embodiment 3 (Steps S304 to S310 in FIG. 24).

As described above, in Modification 1 of Embodiment 3, the portable terminal device 4 measures the reception electric field intensities, whereby the apparatuses 2 do not need to comprise any hardware dedicated to measuring the reception electric field intensity (the reception electric field intensity measurer 24 in FIG. 4). Moreover, the apparatuses 2 need only to have the capability of sending some response to the request from the portable terminal device 4. In other words, in this Modification 1, the apparatuses 2 do not need to execute the process specialized for the present disclosure such as creating and sending measurement data. Therefore, any equipment apparatus comprising a wireless communicator can be used as an apparatus constituting the network system of the present disclosure, whereby the present disclosure could easily be installed.

(Modification 2)

Figure 26:
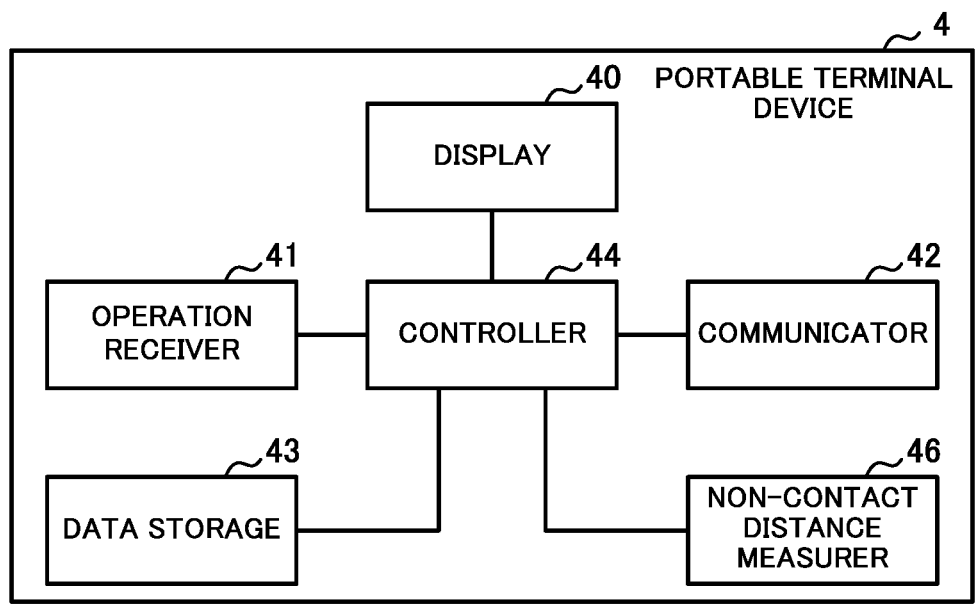
FIG. 26 is a block diagram showing the configuration of a portable terminal device in Modification 2 of Embodiment 3.

Modification 2 of this embodiment is described. In this modification, as shown in FIG. 26, the portable terminal device 4 further includes a non-contact distance measurer 46.

The non-contact distance measurer 46 is, for example, a sensor measuring the distance to an object by irradiating the object with an ultrasonic wave or infrared beam.

Figure 27:
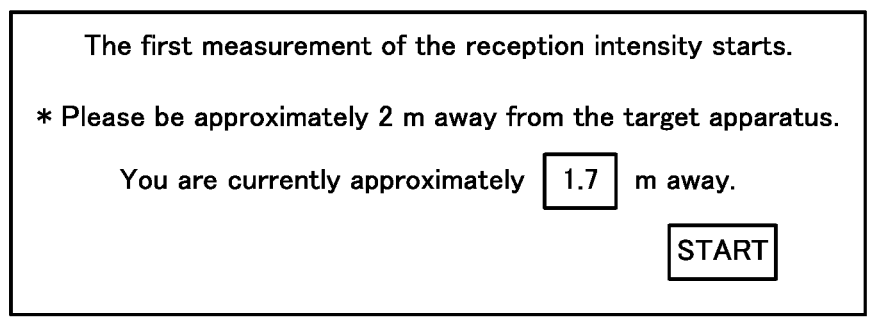
FIG. 27 illustrates an example of the first measurement confirmation screen in Modification 2 of Embodiment 3.

The measurement requestor 4400A in this modification displays a measurement result of the non-contact distance measurer 46, namely the distance to a work-target apparatus 2 on the first to the third measurement confirmation screens (see FIGS. 21 to 23) (see FIG. 27).

In this way, the user can easily move the portable terminal device 4 to a recommended measuring point and, as a result, the accuracy of calculation of the degrees of nearness can be increased.

Moreover, the above-mentioned Modifications 1 and 2 may be combined. In such a case, the broadcaster 4450A displays a measurement result of the non-contact distance measurer 46 on the first to the third measurement confirmation screens (see FIGS. 21 to 23) (see FIG. 27).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is preferably used in building equipment network systems, home network systems, and the like.

REFERENCE SIGNS LIST

1 System controller
2a to 2c Apparatus
3 Network
4 Portable terminal device
10, 40 Display
11, 41 Operation receiver
12 Apparatus communicator
13, 23, 43 Data storage
14, 25, 44 Controller
15 Terminal communicator
20 First communicator
21 Second communicator
22 Main operator
24, 45 Reception electric field intensity measurer
42 Communicator
46 Non-contact distance measurer
140, 4401, 4401A Measurement results collector
141, 441, 441A, 447 Nearness degree calculator
142, 442, 442A Operation requestor for confirmation
143 Target apparatus identifier
440, 440A, 445, 445A Reception electric field intensity acquirer
443, 443A User confirmation receiver
444, 444A Apparatus controller
446 Transmission delay time measurer
448, 4400, 4400A Measurement requestor
4450, 4450A, 4460 Broadcaster
4451, 4451A Measurement results acquirer
4461 Elapsed time acquirer

The invention claimed is:

1. A network system, comprising:
a plurality of processors, the plurality of processors are configured to:
acquire, by an acquirer, a reception electric field intensity or a transmission delay time in wireless communication between each of multiple apparatuses connected to a network and a portable terminal device;
calculate, by a nearness degree calculator, degrees of nearness, wherein a degree of nearness indicates a nearness between each of the multiple apparatuses and the portable terminal device in a numerical value based on an acquisition result by the acquirer;
by an operation requestor:
responsive to the degrees of nearness calculated by the nearness degree calculator, display, on a display, a list based on the degrees of nearness calculated by the nearness degree calculator; and then
receive selection of any one field of fields on the list which is displayed on the display so as to receive designation of a candidate target apparatus from a user; and then
responsive to receiving the designation of the candidate target apparatus from the user, request the candidate target apparatus designated by the user to execute a predetermined operation;
by an apparatus identifier:
after the operation requestor requests the candidate target apparatus to execute the predetermined operation, receive a decision on whether or not to approve the candidate target apparatus from the user, and
responsive to receipt of the decision from the user approving the candidate target apparatus, identify the candidate target apparatus as a work-target apparatus intended by the user; and
measure, by a distance measurer, a distance to an object,
wherein the processor is configured to present to the user information regarding the distance measured by the distance measurer before requesting each of the multiple apparatuses to wirelessly transmit response data.

2. The network system according to claim 1, wherein the fields of the list are arranged in a descending order of the degrees of nearness.

3. The network system according to claim 1, wherein the predetermined operation that is executed by the candidate target apparatus visually confirms the candidate target apparatus.

4. The network system according to claim 1, wherein the plurality of processors are further configured to
responsive to receipt of the decision from the user approving the candidate target apparatus: display, by an apparatus controller, on the display, an operation screen for the work-target apparatus identified by the user and to control the work-target apparatus based on contents of an operation conducted by the user via the operation screen.

5. A portable terminal device, comprising:
at least one processor, the at least one processor is configured to:
acquire, by a reception electric field intensity acquirer, a reception electric field intensity in wireless communication for each of multiple apparatuses connected to a network;
calculate, by a nearness degree calculator, degrees of nearness, wherein a degree of nearness indicates a nearness to each of the multiple apparatuses in a numerical value based on the reception electric field intensity acquired by the reception electric field intensity acquirer;
by an operation requestor:
responsive to the degrees of nearness calculated by the nearness degree calculator, display, on a display, a list based on the degrees of nearness calculated by the nearness degree calculator; and then
receive selection of any one field of fields on the list which is displayed on the display so as to receive designation of a candidate target apparatus from a user; and then
responsive to receiving the designation of the candidate target apparatus from the user, request the candidate target apparatus designated by the user to execute a predetermined operation;
by an apparatus identifier:
after the operation requestor requests the candidate target apparatus to execute the predetermined operation, receive a decision on whether or not to approve the candidate target apparatus from the user, and
responsive to receipt of the decision from the user approving the candidate target apparatus, identify the candidate target apparatus as a work-target apparatus intended by the user,
request, by a transmission requestor, each of the multiple apparatuses to wirelessly transmit response data; and
measure, by a distance measurer, a distance to an object, wherein the transmission requestor presents to the user information regarding the distance measured by the distance measurer before requesting each of the multiple apparatuses to wirelessly transmit the response data.

6. The portable terminal device according to claim 5, wherein the at least one processor is further configured to
by the reception electric field intensity acquirer,
request, by a measurement requestor, each of the multiple apparatuses to measure the reception electric field intensity; and
collect, by a collector, multiple measurement results, wherein a measurement result is collected from each of the multiple apparatuses.

7. The portable terminal device according to claim 6, wherein the at least one processor is further configured to
request, by the measurement requestor, each of the multiple apparatuses to measure the reception electric field intensity multiple times intermittently, and
calculate, by the nearness degree calculator, the degree of nearness based on the multiple measurement results of the reception electric field intensity at each of the multiple apparatuses.

8. The portable terminal device according to claim 7, wherein the at least one processor is further configured to present, by the measurement requestor, to the user, information regarding a recommended measuring point before requesting each of the multiple apparatuses to measure the reception electric field intensity.

9. The portable terminal device according to claim 7, wherein the measurement requestor presents to the user information regarding the distance measured by the distance measurer before requesting each of the multiple apparatuses to measure the reception electric field intensity.

10. The portable terminal device according to claim 5, wherein the at least one processor is further configured to
request, by the transmission requestor, each of the multiple apparatuses to wirelessly transmit the response data multiple times intermittently, and
calculate, by the nearness degree calculator, the degree of nearness based on the multiple measurement results of the reception electric field intensity for each of the multiple apparatuses by the reception electric field intensity measurer.

11. The portable terminal device according to claim 10, wherein the at least one processor is further configured to
present, by the transmission requestor, to the user, information regarding a recommended measuring point before requesting each of the multiple apparatuses to wirelessly transmit the response data.

12. The portable terminal device according to claim 5, wherein the fields of the list are arranged in a descending order of the degrees of nearness.

13. The portable terminal device according to claim 5, wherein
the predetermined operation that is executed by the candidate target apparatus visually confirms the candidate target apparatus.

14. The portable terminal device according to claim 5, wherein the at least one processor is further configured to
responsive to receipt of the decision from the user approving the candidate target apparatus: display, by an apparatus controller, on the display, an operation screen for the work-target apparatus identified by the user and to control the work-target apparatus based on contents of an operation conducted by the user via the operation screen.

15. A target apparatus identification method, comprising:
measuring a reception electric field intensity or a transmission delay time in wireless communication between each of multiple apparatuses connected to a network and a portable terminal device;
calculating degrees of nearness, wherein a degree of nearness indicates a nearness between each of the multiple apparatuses and the portable terminal device in a numerical value based on a result of the measurement;
responsive to the degrees of nearness which are calculated, displaying, on a display, a list based on the calculated degrees of nearness; and then
receiving selection of any one field of fields on the list which is displayed on the display so as to receive designation of a candidate target apparatus from a user; and then
responsive to receiving the designation of the candidate target apparatus from the user, requesting the candidate target apparatus designated by the user to execute a predetermined operation;

after the candidate target apparatus is requested to execute the predetermined operation, receiving a decision on whether or not to approve the candidate target apparatus from the user, and responsive to receipt of the decision from the user approving the candidate target apparatus, identifying the candidate target apparatus as a work-target apparatus intended by the user; and measuring, by a distance measurer, a distance to an object, and presenting to the user information regarding the distance measured by the distance measurer before requesting each of the multiple apparatuses to wirelessly transmit response data.

16. The target apparatus identification method according to claim 15, wherein the fields of the list are arranged in a descending order of the degrees of nearness.

17. The target apparatus identification method according to claim 15, wherein the predetermined operation that is executed by the candidate target apparatus visually confirms the candidate target apparatus.

18. The target apparatus identification method according to claim 15, further comprising responsive to receipt of the decision from the user approving the candidate target apparatus, displaying, on the display, an operation screen for the work-target apparatus identified by the user and to control the work-target apparatus based on contents of an operation conducted by the user via the operation screen.

* * * * *